United States Patent
Mikuni

(10) Patent No.: US 7,027,823 B2
(45) Date of Patent: Apr. 11, 2006

(54) APPARATUS AND METHOD FOR SEARCHING TARGET POSITION AND RECORDING MEDIUM

(75) Inventor: Shin Mikuni, Tokorozawa (JP)

(73) Assignee: Casio Computer Co., Ltd., Tokyo (JP)

( * ) Notice: Subject to any disclaimer, the term of this patent is extended or adjusted under 35 U.S.C. 154(b) by 628 days.

(21) Appl. No.: 10/210,235

(22) Filed: Aug. 1, 2002

(65) Prior Publication Data

US 2003/0032436 A1 Feb. 13, 2003

(30) Foreign Application Priority Data

Aug. 7, 2001 (JP) .............................. 2001-239274
Jul. 5, 2002 (JP) .............................. 2002-197272

(51) Int. Cl.
*H04Q 7/20* (2006.01)
*H04M 1/00* (2006.01)
*H04B 1/38* (2006.01)

(52) U.S. Cl. ................ 455/457; 455/456.1; 455/456.5; 455/456.6; 455/550.1; 455/556.1; 455/566

(58) Field of Classification Search ................ 455/427, 455/456.1–456.6, 457, 550.1, 552.1, 553.1, 455/556.1, 556.2, 557, 404.2, 566, 414.1, 455/524, 66.1, 67.11, 422.1, 423–425; 342/450, 342/463; 709/219; 701/207–209, 213–216; 352/100, 131, 174, 175, 176; 396/429, 439; 725/48, 51–52; 348/208.16, 14.01, 14.02, 348/14.16, 135, 142, 143, 169, 208.14
See application file for complete search history.

(56) References Cited

U.S. PATENT DOCUMENTS

| | | | | |
|---|---|---|---|---|
| 4,613,898 A | * | 9/1986 | Bagnall-Wild et al. | 348/39 |
| 5,262,867 A | * | 11/1993 | Kojima | 348/39 |
| 5,913,078 A | * | 6/1999 | Kimura et al. | 396/50 |
| 6,346,938 B1 | * | 2/2002 | Chan et al. | 345/419 |
| 6,525,770 B1 | * | 2/2003 | Ueda et al. | 348/316 |
| 6,636,256 B1 | * | 10/2003 | Passman et al. | 348/143 |
| 6,690,294 B1 | * | 2/2004 | Zierden | 340/937 |
| 6,741,864 B1 | * | 5/2004 | Wilcock et al. | 455/456.1 |
| 6,748,223 B1 | * | 6/2004 | Fraccaroli | 455/456.1 |
| 2002/0057340 A1 | * | 5/2002 | Fernandez et al. | 348/143 |
| 2002/0112063 A1 | * | 8/2002 | Lohr et al. | 709/230 |
| 2002/0113872 A1 | * | 8/2002 | Kinjo | 348/113 |

FOREIGN PATENT DOCUMENTS

| JP | 11125855 A | * | 5/1999 |
|---|---|---|---|
| JP | 2001092806 A | * | 4/2001 |

* cited by examiner

*Primary Examiner*—William Trost
*Assistant Examiner*—Meless Zewdu
(74) *Attorney, Agent, or Firm*—Frishauf, Holtz, Goodman & Chick, P.C.

(57) ABSTRACT

A target position search apparatus comprises an information obtaining device which obtains position information of a target object, and position information, an imaging azimuth, and a angle of view of a camera; a calculation device which calculates a position of the target position on an image obtained by the camera based on the position information of the target object, and the position information, imaging azimuth, and angle of view of the camera which are obtained by the information obtaining device; and an output device which outputs the position information of the target object in the image calculated by the calculation device.

33 Claims, 14 Drawing Sheets

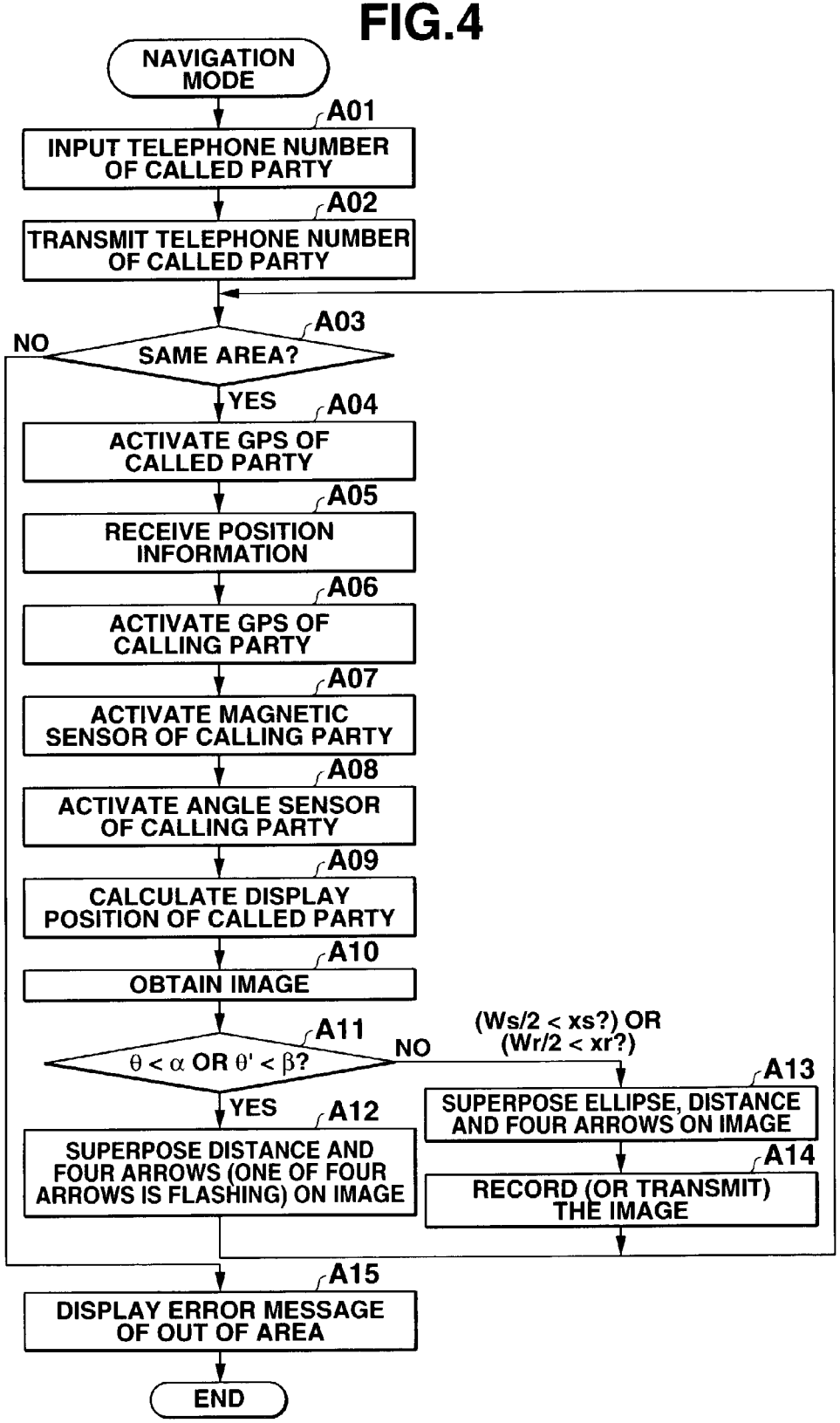

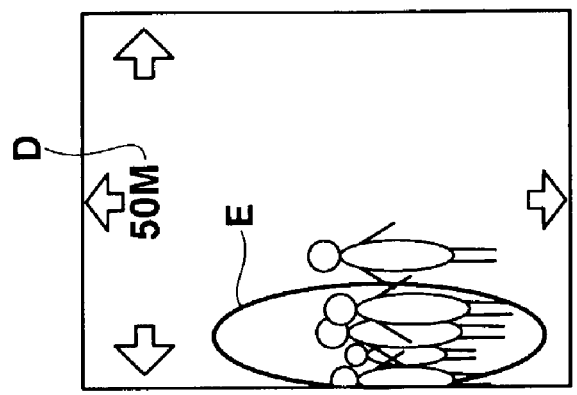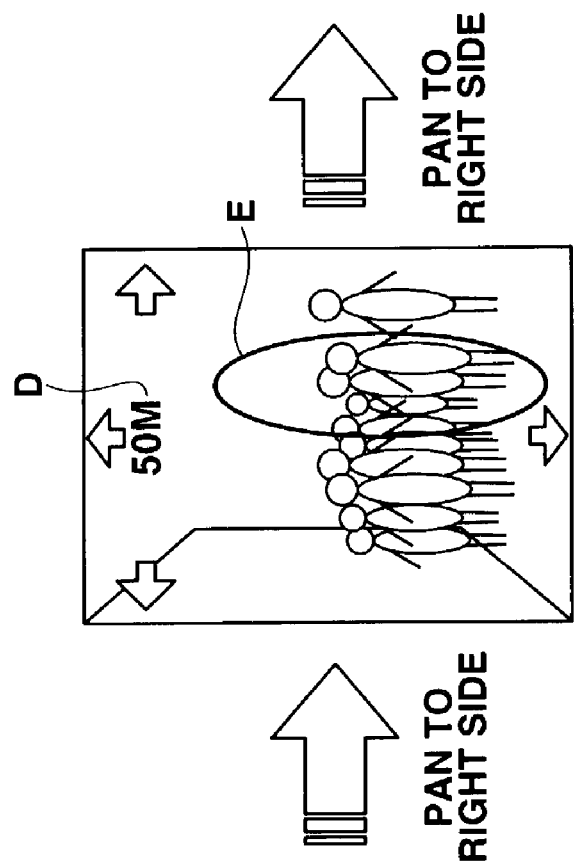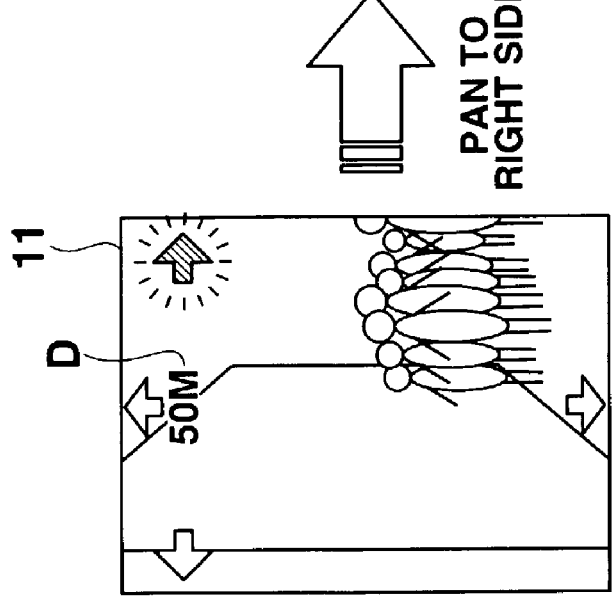

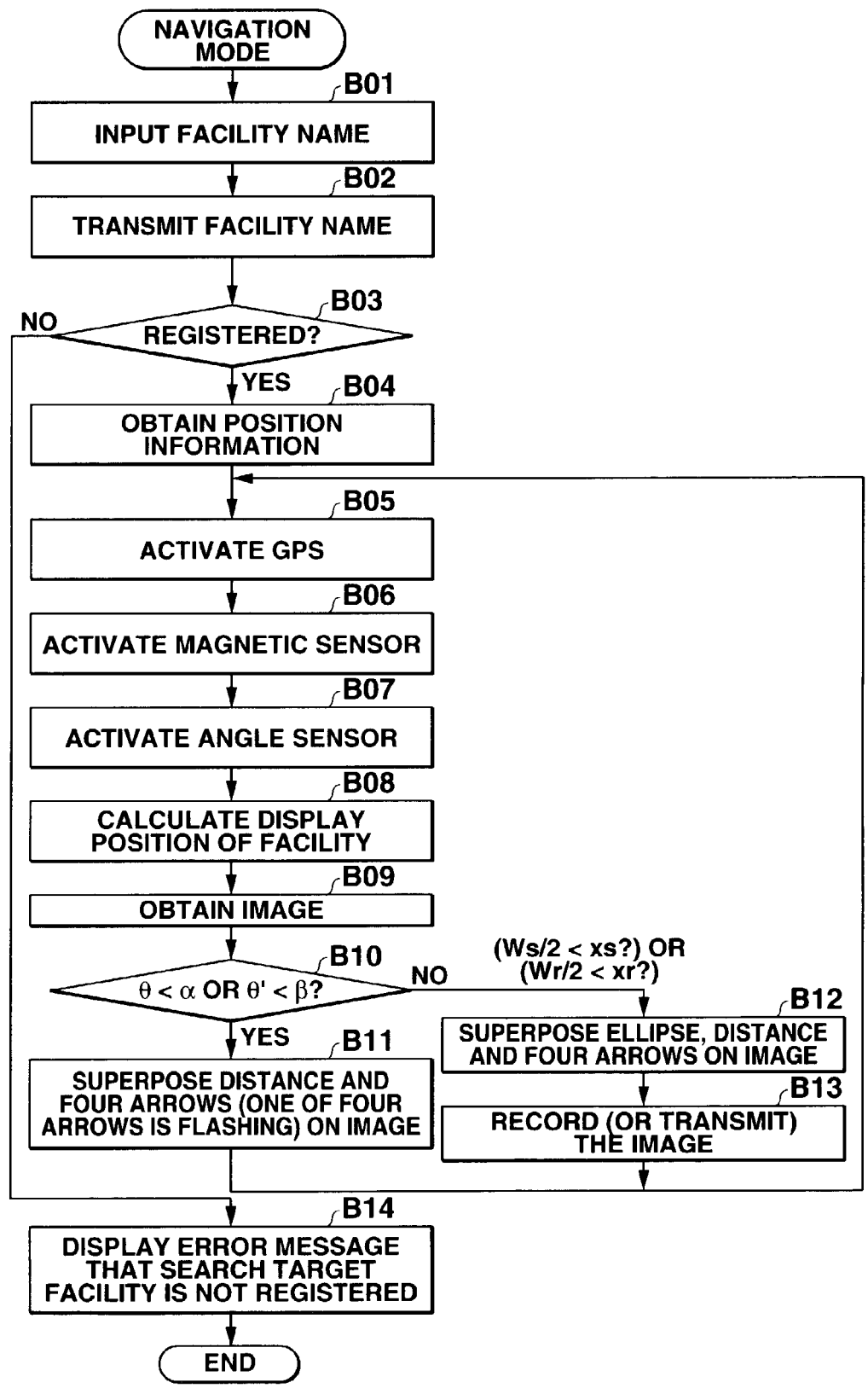

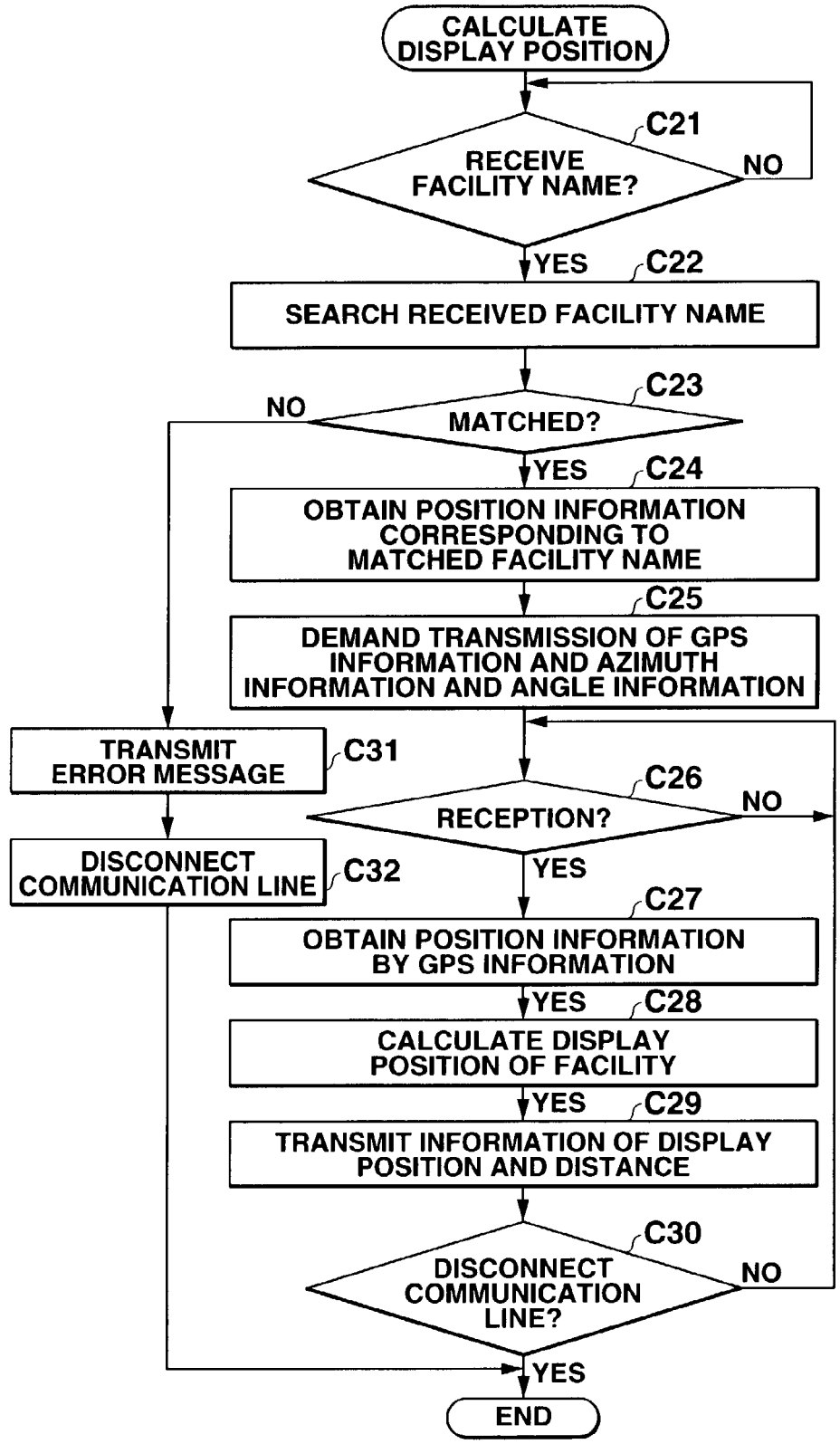

APPARATUS AND METHOD FOR SEARCHING TARGET POSITION AND RECORDING MEDIUM

CROSS-REFERENCE TO RELATED APPLICATIONS

This application is based upon and claims the benefit of priority from the prior Japanese Patent Application No. 2001-239274, filed Aug. 7, 2001 and Japanese Patent Application No. 2002-197272, filed Jul. 5, 2002, the entire contents of which are incorporated herein by reference.

BACKGROUND OF THE INVENTION

1. Field of the Invention

The present invention relates to an apparatus and a method of searching a target position by using, for example, a portable telephone system and a recording medium having a search program recorded therein.

2. Description of the Related Art

When a person finds out the other party for meeting by appointment, it is thought to take methods such that by utilizing a portable telephone, both parties teach each other a target object near a location of the other party while they are speaking, or a name of a meeting place or facility name is taught in advance to find out by watching a map.

However, it is often impossible to find out the other party, in case that an intention is not told to the other party, the meeting person is not acquainted, or a person is not used to watching the map.

Particularly in case of crowded places, it is more difficult to find out the other party.

When the target object is not a person having the portable telephone but a facility such as a company or a store, in order to find out the target facility, it is proposed that a navigate system equipped with a car or a map is utilized.

However, in these cases, the target facility can be hardly found if a signboard of the target facility is not prominent or if a person is not used to watching the map.

BRIEF SUMMARY OF THE INVENTION

The present invention is directed to method and apparatus that substantially obviates one or more of the problems due to limitations and disadvantages of the related art.

According to an embodiment of the present invention, a target position search apparatus comprises:

an information obtaining device that obtains position information of a target object, and imaging position information, imaging azimuth information, and imaging angle-of-view information of a camera;

a calculation device which calculates a position of the target position in an image obtained by the camera based on the position information of the target object, and the imaging position information, imaging azimuth information, and imaging angle-of-view information of the camera which are obtained by the information obtaining device; and an output device that outputs information showing the position of the target object in the image calculated by the calculation device.

The target position search apparatus easily find a target object.

According to another embodiment of the present invention, a target position search apparatus comprises:

an image pickup device that picks up an image;

a display device that displays the image picked up by the image pickup device;

an information obtaining device that obtains imaging position information and imaging azimuth information of the image pickup device;

a transmission device that transmits the imaging position information and the imaging azimuth information of the image pickup device that are obtained by the information obtaining device to an external apparatus;

a reception device which receives position information of the target object in the image picked up by the image pickup device, which is calculated by the external apparatus based on the imaging position information and the imaging azimuth information transmitted from the transmission device, position information of the target object, and an angle-of-view information of the image pickup device; and a control device which outputs display information corresponding to the position information of the target object in the image received by the reception device to the display device.

The target position search apparatus easily find a target object.

According to still another embodiment of the present invention, a target position search apparatus comprises:

an information obtaining device which obtains position information of a target object, and an imaging position information, an imaging azimuth information, and angle-of-view information of a camera;

a determination device which determinates whether or not the target object stays within an angle of view of the camera based on the position information of the target object and the imaging position information, imaging azimuth information, and angle-of-view information of the camera which are obtained by the information obtaining device; and a control device that performs a predetermined process corresponding to a result of determination made by the determination device.

The target position search apparatus easily find a target object.

According to a still further embodiment of the present invention, a target position search apparatus comprises:

an image pickup device that picks up an image;

a display device that displays the image obtained by the image pickup device;

an information obtaining device that obtains imaging position information and imaging azimuth information of the image pickup device;

a transmission device that transmits the imaging position information and the imaging azimuth information of the image pickup device that are obtained by the information obtaining device to an external apparatus which determines whether or not the target object stays within an angle of view of the image pickup device based on the imaging position information and the imaging azimuth information transmitted from the transmission device, position information of a target object, and an angle-of-view information of the image pickup device;

a reception device which receives information showing a result of determination made by the external apparatus; and a control device that performs a predetermined process corresponding to the information showing the result of determination received by the reception device.

The target position search apparatus easily find a target object.

According to a still further embodiment of the present invention, a target position search apparatus comprises:

means for obtaining position information of a target object, and imaging position information, imaging azimuth information, and angle-of-view information of a camera;

means for calculating a position of the target position in an image obtained by the camera based on the position information of the target object, and the imaging position information, imaging azimuth information, and angle-of-view information of the camera which are obtained by the information obtaining means; and means for outputting information showing the position of the target object in the image calculated by the calculating means.

The target position search apparatus easily find a target object.

According to still another embodiment of the present invention, a target position search apparatus comprises:

means for obtaining position information of a target object, and imaging position information, imaging azimuth information, and angle-of-view information of a camera;

means for determining whether or not the target object stays within an angle of view of the camera based on the position information of the target object and the imaging position information, imaging azimuth information, and angle-of-view information of the camera which are obtained by the information obtaining means; and means for performing a predetermined process corresponding to a result of determination made by the determining means.

The target position search apparatus easily find a target object.

According to a still further embodiment of the present invention, an article of manufacture comprising a computer usable medium having a computer readable program code embodied therein, the computer readable program code comprises:

a first computer readable program code for causing a computer to obtain position information of a target object, and imaging position information, imaging azimuth information, and angle-of-view information of a camera;

a second computer readable program code for causing a computer to calculate a position of the target position on an image obtained by the camera based on the position information of the target object, and the imaging position information, imaging azimuth information, and angle-of-view information of the camera which are obtained by the first computer readable program code; and a third computer readable program code for causing a computer to output information showing the position of the target object in the image calculated by the second computer readable program code.

A target object is easily found.

According to a still further embodiment of the present invention, an article of manufacture comprising a computer usable medium having a computer readable program code embodied therein, the computer readable program code comprises:

a first computer readable program code for causing a computer to obtain position information of a target object, and imaging position information, imaging azimuth information, and angle-of-view information of a camera;

a second computer readable program code for causing a computer to determine whether or not the target object stays within an angle of view of the camera based on the position information of the target object, and the imaging position information, imaging azimuth information, and angle-of-view information of the camera which are obtained by the first computer readable program code; and a third computer readable program code for causing a computer to perform a predetermined process corresponding to a result of determination made by the second computer readable program code.

A target object is easily found.

According to still another embodiment of the present invention, a target position search method comprises:

a first step for obtaining position information of a target object, and imaging position information, imaging azimuth information, and angle-of-view information of a camera;

a second step for calculating a position of the target position in an image obtained by the camera based on the position information of the target object, and the imaging position information, imaging azimuth information, and angle-of-view information of the camera which are obtained by the first step; and a third step for outputting information showing the position of the target object in the image calculated by the second step.

The target position search method easily find a target object.

According to still another embodiment of the present invention, a target position search method comprises:

a first step for obtaining position information of a target object and imaging position information, imaging azimuth information, and angle-of-view information of a camera;

a second step for determining whether or not the target object stays within an angle of view of the camera based on the position information of the target object and the imaging position information, imaging azimuth information, and angle-of-view information of the camera which are obtained by the first step; and a third step for performing a predetermined process corresponding to a result of determination made by the second step.

The target position search method easily find a target object.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the present invention and, together with the general description given above and the detailed description of the embodiments given below, serve to explain the principles of the present invention in which:

FIG. 4 is a flowchart showing an operational process at the portable terminal according to the first embodiment of the invention;

FIGS. 6A, 6B, and 6C illustrate a method of guiding a target position on a display screen according to the first embodiment of the invention;

FIG. 8 is a flowchart showing an operational process at a portable terminal according to the second embodiment of the invention;

FIGS. 11A and 11B are flowcharts showing operational processes at the service center apparatus and a portable terminal according to the third embodiment of the invention;

DETAILED DESCRIPTION OF THE INVENTION

Figure 1:
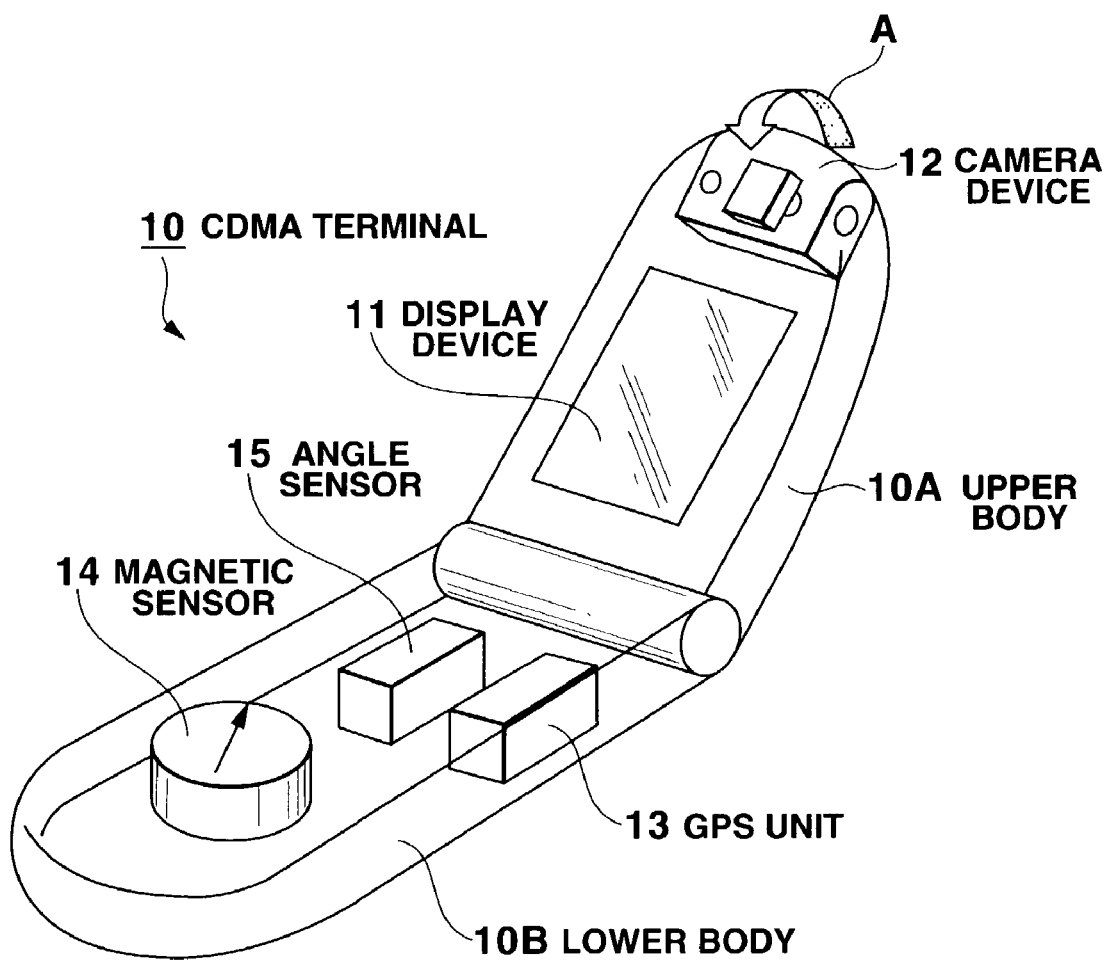
FIG. 1 is a perspective view showing a schematic arrangement of only main parts extracted from a portable terminal according to the first embodiment of the invention.

An embodiment of a target position search apparatus according to the present invention will now be described with reference to the accompanying drawings. FIG. 1 is a block diagram showing an arrangement of the first embodiment.

First Embodiment

As the first embodiment, it will be described a navigation service system using a portable terminal (hereinafter referred to "CDMA terminal") of a CDMA (Code Division Multiple Access) method, which is a kind of portable telephones, equipped with a GPS (Global Positioning System) function.

FIG. 1 shows a schematic arrangement of a foldable CDMA terminal 10 (a target position search apparatus), which is owned by users, with the foldable CDMA terminal open. A display device 11 comprising a TFT color liquid crystal panel with a back light is provided on an inside surface of an upper body 10a. A camera device 12 having a rotatable imaging direction as shown by an arrow A is provided on an upper end portion of the upper body 10a. A black and white display device can be applicable to the display device 11.

On the other hand, in a lower body 10b, a key input device that is not shown here is provided. The lower body 10b also includes a GPS unit 13, a magnetic (direction) sensor 14 which obtains information of an imaging direction (pan angle) to which the camera device 12 is pointed by detecting terrestrial magnetism, and an angle sensor 15 which obtains information of an imaging angle (tilt angle) which the camera device 12 is pointed to a height direction.

As described above, the CDMA terminal 10 is fordable and the camera device 12 is rotatable so that, while the magnetic sensor 14 built in the lower body 10b is maintained horizontally, the camera device 12 can be rotated to adjust an angle which the camera device 12 takes easily an image according to a state of use or an imaging environment or the display device 11 can be adjusted to an angle which users watch easily.

In case that the camera device 12 and the upper body 10a are arranged to be rotatable, the magnetic sensor 14 for obtaining the imaging azimuth and the angle sensor 15 for obtaining the imaging angle are built in not the upper body 10a (camera device 12) but the lower body 10b. This causes problems such that a real imaging direction is not fit to the direction obtained by the magnetic sensor 14, or a real imaging direction is not fit to the direction obtained by the angle sensor 15 in a certain rotation state of the camera device 12.

In order to always obtain a precise imaging azimuth and imaging angle, it is necessary that each rotation state of the camera device 12 and the upper body 10a is detected respectively, according to a result of the detection, information of the imaging azimuth obtained by the magnetic sensor 14 or information of the imaging angle obtained by the angle sensor 15 is corrected.

However it is assumed that the camera device 12 and the upper body 10a are always set to a predetermined rotation state in case of obtaining the imaging azimuth or the imaging angle, it is not necessary to correct information of the above-described imaging azimuth and imaging direction.

Figure 2:
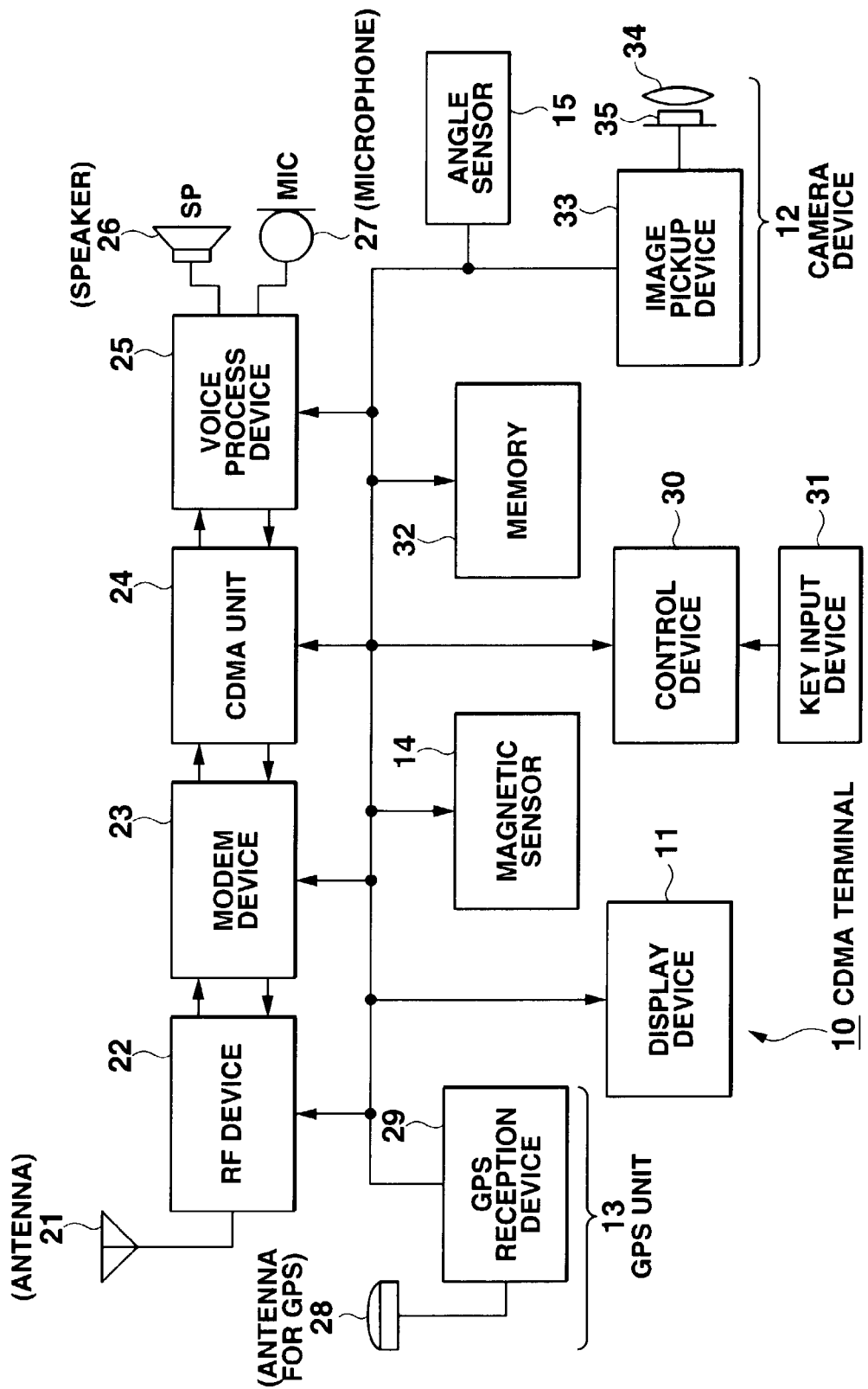
FIG. 2 is a block diagram showing a circuit configuration of the portable terminal according to the first embodiment of the invention.

FIG. 2 shows a circuit configuration of the CDMA terminal 10. An antenna 21 for communicating with a nearest base station by the CDMA method is connected to an RF (Radio Frequency) unit 22.

In case of reception, the RF unit 22 separates a signal inputted from the antenna 21 from a frequency axis by a duplexer, and converts its frequency to an IF (Intermediate Frequency) signal by mixing with a local oscillation signal of a predetermined frequency outputted from a PLL (Phase-Locked Loop) synthesizer. Then, the RF unit 22 extracts only a receiving frequency channel by a broadband BPS (Band Pass Filter), amplifies a signal level of a desired receiving wave by an AGC (Automatic Gain Control) amplifier and outputs to a modem 23 of a next stage.

On the other hand, in case of transmission, the RF unit 22 performs transmission power control of a modulating signal of OQPSK (Offset Quadric-Phase Shift Keying) transmitted from the modem 23 by the AGC amplifier corresponding to control from a control device 30 described below. After that, the RF unit 22 mixes with a local oscillation signal of a predetermined frequency outputted from the PLL synthesizer to convert its frequency to an RF band, amplifies to high power by a PA (Power Amplifier) and transmits from the antenna 21 through the duplexer.

In case of reception, the modem 23 separates the IF signal from the RF unit 22 into a base band I/Q (In-phase/Quadrature-phase) signal by a quadrature demodulator, and modulates into a digital signal at a sampling rate of about 10 MHz to output to a CDMA unit 24.

In case of transmission, the modem 23 modulates an I/Q signal of a digital value transmitted from the CDMA unit 24 into an analog signal at a sampling rate of about 5 MHz, and then modulates to OQPSK by a quadrature modulator to transmit to the RF unit 22.

In case of reception, the CDMA unit 24 inputs the digital signal from the modem 23 to a timing extraction circuit of a PN (Pseudo Noise) code and a plurality of demodulating circuits performing inverse-spread and demodulation according to indication of the timing circuit. The CDMA unit 24 then synchronizes a plurality of demodulating symbols outputted from there and synthesizes by a synthesizer to output to a sound process unit 25.

In case of transmission, the CDMA unit 24 performs spread process of an output symbol from the sound process unit 25, then performs band limiting by a digital filter to the I/Q signal and transmits to the modem 23.

In case of reception, the sound process unit 25 de-interleaves the output symbol from the CDMA unit 24, and processes error correction by a Viterbi modulator. After that, sound process unit 25 decompresses from a digital signal compressed by a voice process DSP (Digital Signal Processor) to a normal digital audio signal, and modulates into an analog signal to drive loudly a speaker (SP) 26.

In case of transmission, the sound process unit 25 modulates an analog audio signal inputted from a microphone (MIC) 27 into a digital signal to compress not more than one-eighth by the voice process DSP, encodes into an error correction coding by a convolution encoder to interleave and transmits the output symbol to the CDMA unit 24.

An antenna 28 for GPS is connected to a GPS receiver 29.

The GPS receiver 29 is integrated with the antenna 28 to constitute the GPS unit 13. The GPS receiver 29 inversely spreads contents of spectrum spread according to GPS radio wave of a center frequency of 1.57542 GHz received by the antenna 28 from at least three preferably more than three GPS satellites by a PN (Pseudo Noise) code which is referred to as a C/A code to demodulate, calculates a present position (latitude, longitude, altitude) in three-dimensional space and present time, and the calculated result is transmitted to the control device 30.

The control device 30 is connected to the RF unit 22, modem 23, CDMA unit 24, a sound process unit 25, and the GPS receiver 29. The display device 11, a key input device 31, the magnetic sensor 14, angle sensor 15, a memory 32, and an image pickup device 33 are connected to the control device 30.

The control device 30 includes CPU, ROM, and RAM, and controls the whole terminal based on a predetermined operation program stored in the ROM. The ROM stores in a nonvolatile manner control programs for a communication control, a transmission and reception control of communication data, display control in the display device 11, a navigation program described below, and an operation program for the control device 30 including various controls for operating the CDMA terminal 10.

A recording medium which stores the programs are not limited to the ROM, a portable recording medium such as a magnetic recording medium, an optical recording medium, a semiconductor memory except ROM, a hard disk and a CD-ROM may be applicable. A part of or the whole program to be stored in the recording medium may be arranged by receiving via a network. Furthermore, the recording medium may be a recording medium of a server constructed on a network.

The RAM provided in the control device 30 has a work area storing temporarily various data treated in the control of the control device 30 and a telephone directory area registering a pair of a calling name and a telephone number. In the telephone directory area, storing contents are held by a backup power supply independent of application of power of the CDMA terminal 10.

The key input device 31 has dial (numeric) keys combined with character input keys, a "speaking" key, an "off" key, a redial key, a mode select key, a cursor key and a shutter key, its operation signal is inputted directly to the control device 30.

The memory 32 stores various data or application programs downloaded through a telephone network (communication network), digital images obtained by the camera device 12, and the like.

An image pickup device 33 comprises an optical lens system 34 and a solid-state imaging device 35 such as CCD (Charge Coupled Device) to constitute the above-described camera device 12. When an object image focused onto an imaging surface of the solid-state imaging device 35 by the optical lens system 34 is read out as an analog signal to the image pickup device 33, the image pickup device 33 modulates it into a digital signal, performs a predetermined color process and then outputs it to the control device 30.

Operation of the embodiment of the invention will be described below.

Figure 3:
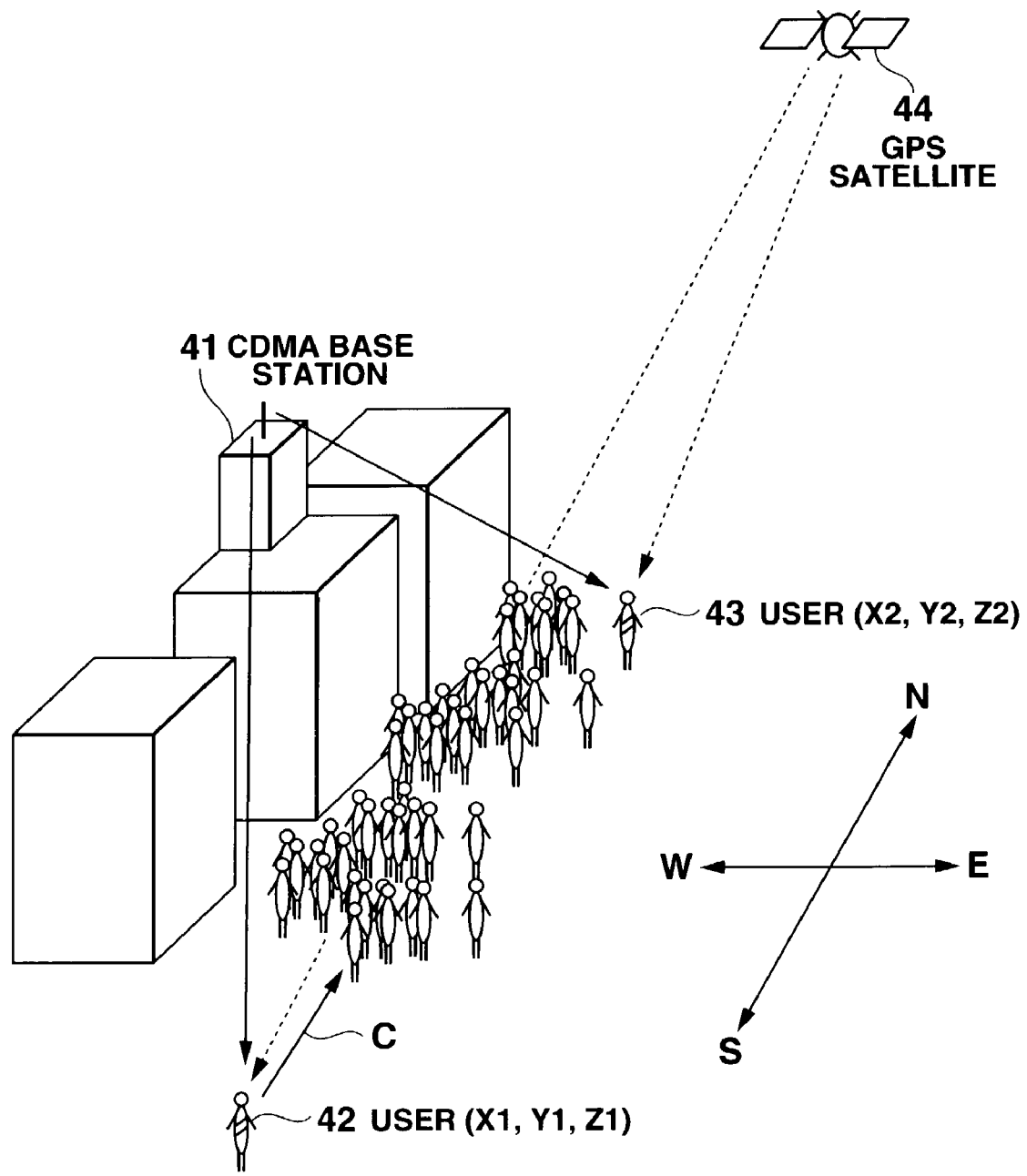
FIG. 3 illustrates an operational environment of a total system according to the first embodiment of the invention.

An operational environment of a navigation service system will be described referring to FIG. 3. FIG. 3 shows a state of a connection, in which CDMA terminals 10 (not shown) owned by two of parties 42 and 43 who want to see are connected via a CDMA base station 41 disposed on a roof of a building with a CDMA network (not shown) and a service center apparatus which is operated by a communication common carrier supervising the CDMA network. At the same time the CDMA terminals 10 owned by the parties 42 and 43 can measure a present position by receiving a coming radio wave from a GPS satellite 44.

It is assumed that the user 42 and the user 43 are both in a crowd and hardly recognize directly each other, the user 42 calls the CDMA terminal 10 of the user 43 by using the CDMA terminal 10 of the user 42 to ensure a communication state and then moves toward a place where the user 43 is expected to be as shown by the arrow C.

FIG. 4 shows process contents of the navigation service that is performed on the CDMA terminal 10 owned by the user 42 of the calling party side. The process is based on an operation program controlled mainly by the control device 30.

At first, when the user 42 sets to a navigation mode by operating the mode select key of the key input device 31, according to contents of an input screen displayed in the display device 11, a telephone number of the CDMA terminal 10 owned by the called party 43 is inputted (step A01).

When completion of the input is directed by operating the "speaking" key of the key input device 31, a calling process is performed by the inputted telephone number, the telephone number is transmitted to the service center apparatus, and a location of the terminal owned by the user of the called party is inquired (step A02).

At this point, the service center apparatus, which has received the telephone number of the called party, inquires a registered state of a present location of the CDMA terminal 10 of the telephone number, determinates by its reply whether or not the calling party 42 and the called party 43 exist within a communication area of the CDMA base station 41, in other words, determinates whether or not the calling party 42 and the called party 43 exist within a distance being able to perform an image display (step A03). In case that a result of the determination is "within communication area", the service center apparatus connects and maintains a communication line between the CDMA terminal 10 of the calling party 42 and the CDMA terminal 10 of the called party 43.

When the CDMA terminal 10 of the calling party 42 determinates that the called party 43 does not exist within the same communication area of the CDMA base station 41 as the calling party 42 in step A03, the CDMA terminal 10 of the calling party 42 regards the called party 43 as being out of the communication area (including a communication area of another CDMA base station 41) to display an error message in the display device 11 (step A15), and finishes the process.

In case that the result of the determination of the service center apparatus is "out of communication area", the CDMA terminal 10 of the calling party 42 may be arranged to display only a received error message in a manner that the service center apparatus not only performs a process not to connect (disconnect) a communication line to the terminal of the called party 43, but also the service center apparatus transmits the error message to the CDMA terminal 10 of the calling party 42.

On the other hand, in case that the service center apparatus determinates that the called party 43 is in the same communication area as the calling party 42 in step A03, by properly transmitting various commands to the terminal of the called party 43, the GPS reception device 29 of the CDMA terminal 10 owned by the called party 43 is activated (step A04), which causes information of a location (latitude, longitude, altitude) of the CDMA terminal 10 of the called party 43 to be obtained. The service center apparatus makes the CDMA terminal 10 of the called party 43 transfer the information of the location of the called party 43 to the CDMA terminal 10 of the calling party 42, the CDMA terminal 10 of the calling party 42 receives information of the location of the called party 43 to store in the work area of the RAM (step A05).

An active state of the GPS receiving device 29 in the calling party 42 is ensured, the information of the present location (latitude, longitude, altitude) at that point is taken to store in the work area of the RAM (step A06). At the same time, an active state of the magnetic sensor 14 is ensured and information of the azimuth (pan angle) to which the camera device 12 is directed at that point is obtained to store in the work area of the RAM (step A07).

An active state of the angle sensor 15 is ensured and information of an angle (tilt angle) of an altitudinal direction to which the camera device 12 is directed at that point is obtained to store in the work area of the RAM (step A08).

Accordingly, based on the information of the location of the called party 43, the information of the location of the calling party 42 itself and the azimuth and angular information to which the camera device 12 is directed, which are all stored in the work area of the RAM, a position to be displayed, which indicates the location of the called party 43 in an image picked-up by the camera device 12 is calculated (step A09).

Figure 5A:
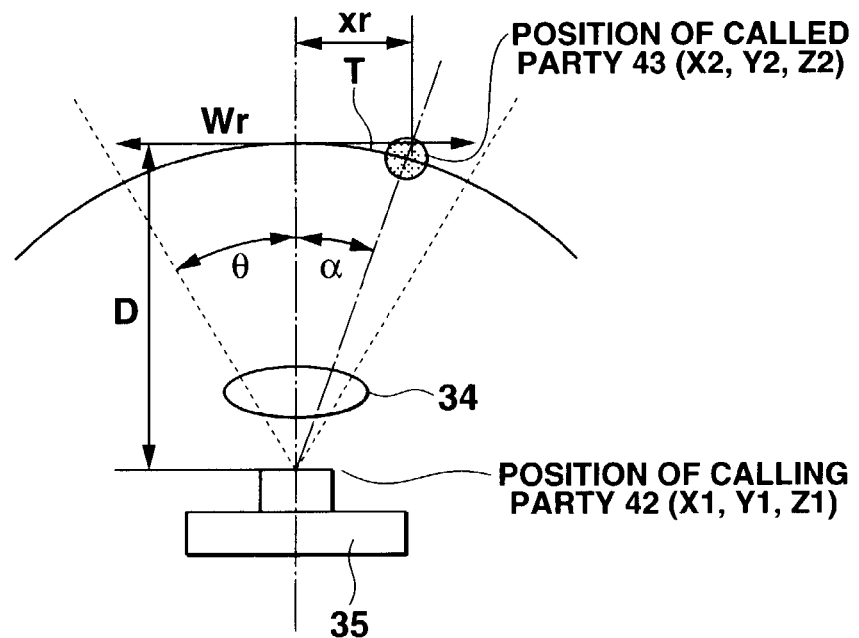
FIGS. 5A and 5B illustrate a method of identifying a target position on a display screen according to the first embodiment of the invention.

FIG. 5A shows a relation between an angle of view obtained by the camera device 12 of the CDMA terminal 10 of the calling party 42 and a location of the called party 43. In this case, the position information (X: latitude, Y: longitude, Z: altitude) of the calling party 42 is (X1, Y1, Z1) and the position information of the called party 43 is (X2, Y2, Z2).

A method of calculating a location of a horizontal direction of the called party 43 in the display screen will be explained below.

In order to simplify explanation, an explanation concerning a method of calculating a location of an altitudinal direction of the called party 43 in the display screen is abbreviated, because the calculation of the altitudinal direction can be performed by almost the same method as that of the horizontal direction.

At first, a distance D between the parties 42 and 43 is obtained from each position coordinate (latitude, longitude) of the parties 42 and 43. It is assumed that an arc has a radius of the distance D from the calling party 42 to the called party 43 and a tangent T on the arc passes through a central position of a horizontal angle of view $2\theta$ of the solid-state imaging device 35 (optical lens system 34). The length of the tangent T within the horizontal angle of view $2\theta$ can be calculated as Wr. Where information of the horizontal angle of view is stored in the memory 32 in advance. When a zoom function is provided, it is necessary that the information of the horizontal angle of view is stored in the memory 32 corresponding to each zoom ratio and read out from the memory 32 corresponding to a present zoom ratio.

An azimuth of a central direction of the horizontal angle of view is determined by the magnetic sensor 14, and an azimuth of the called party 43 is determined by each positional coordinate of the parties 42 and 43. Therefore, a horizontal error angle $\alpha$ from the central direction to the location of the called party 43 can be calculated.

By the length Wr and a relation between the error angle $\alpha$ and the horizontal angle of view $2\theta$ in the camera device 12, a horizontal distance xr, which is a difference between a central position and a location of the called party 43 on the tangent T, can be calculated.

Figure 5B:
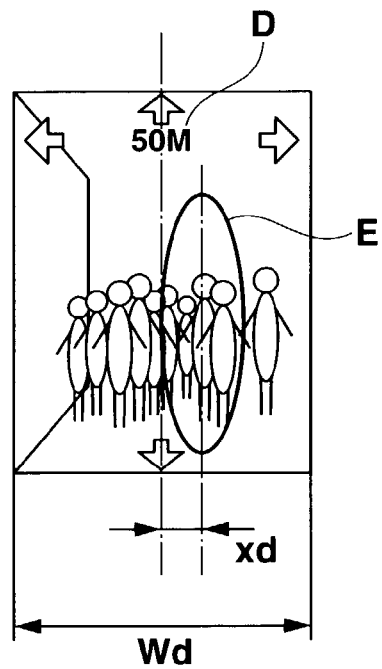

Accordingly, by a ratio of the length Wr to a breadth Wd of a screen of the display device 11 shown in FIG. 5B, and the distance xr, a horizontal distance xd from a central position to the called party 43 in the display device 11 can be calculated.

The horizontal error angle $\alpha$, the horizontal distance xr and the horizontal distance xd have a positive value when called party 43 is in the right side from a center of an imaging direction (screen), and have a negative value when the called party 43 is in the left side.

A length Ws within a vertical angle of view, a vertical error angle $\beta$, a vertical distance xs which is a difference from a central position on the tangent and a vertical distance xe from a central position to the called party 43 in the display device 11 are obtained from a result of a calculation for a vertical direction like the horizontal direction, where a vertical angle of view is $2\theta'$ and a long of the screen is We. The information of the vertical angle of view is stored in the memory 32 in advance. When the zoom function is provided, it is necessary that the information of the vertical angle of view is stored in the memory 32 corresponding to each zoom ratio and read out from the memory 32 corresponding to a present zoom ratio.

The vertical error angle $\beta$, the vertical distance xs and the vertical distance xe have a positive value when the called party 43 is in the upper side from a center of an imaging direction (screen), and have a negative value when the called party 43 is in the lower side.

After a display position of the called party is calculated in step A09, an image signal is obtained by driving the solid-state imaging device 35 constituting the camera device 12. The image signal is subjected to a color process by the image pickup device 33 to obtain an image signal of a digital value, and stored in the work area of the RAM (step A10).

After the image signal is obtained, the CDMA terminal of the calling party 42 determinates whether or not the called party 43 (CDMA terminal 10) is within a range of the angle of view taken by the camera device 12 and can be displayed on the screen of the display device 11, in a manner that the CDMA terminal of the calling party 42 determinates by calculating whether or not the horizontal error angle $\alpha$ from an image center to a position of the called party 43 exceeds the half vertical angle of view $\theta$, or whether or not the vertical error angle β from the image center to the position of the called party 43 exceeds the half vertical angle of view θ' (step A11).

By calculating whether or not the shifted distance xr (or distance xd) exceeds a half of the distance Wr (breadth Wd), or whether or not the shifted distance xs (or distance xe) exceeds a half of the distance Ws (long We), whether or not the called party 43 is stayed within the range of the angle of view can be determined.

As a result of the calculation, in case that the CDMA terminal 10 of the calling party 42 determined that the position of the called party 43 can be displayed on the screen of the display device 11, as shown in FIG. 5B, an ellipse E showing the position of the called party 43 is displayed on a display position calculated in step A09, at the same time the distance D to the called party 43 and an arrow, which shows a direction of the called party 43 in case that the called party 43 is out of the screen, are displayed by superposing on an image in the display device 11 (step A13). Then, a present image stored in the work area of the RAM is recorded in the memory 32 (step A14), returning to the process of step A03 to repeat the same process. In step A14, it is also possible that the image is not recorded, but transmitted (forward) to an external image recording apparatus designated in advance through a communication network.

FIG. 5B illustrates a state that a position of the called party 43 stays within the screen of the display device 11. The ellipse E showing the position of the called party 43, "50 M" of the distance to the called party 43 and four arrows of four sides of the screen, which dare not to perform a special flashing or coloring because the called party 43 stays in the screen, are shown by superposing on an image taken by the camera device 12.

On the other hand, as a result of the calculation in step A11, in case that the CDMA terminal 10 of the calling party 42 determined that the position of the called party 43 can not be displayed on the screen of the display device 11 because the position of the called party 43 is out of the screen, the distance D to the called party 43 and an arrow showing a direction which the called party 43 is out of the screen are displayed by superposing on an image in the display device 11 (step A12), then returning to the process of step A03 to repeat the same process.

When the position of the called party 43 is out of the screen of the display device 11, instead of not showing the ellipse E indicating the position of the called party 43, the distance to the called party 43 and the four arrows of four sides of the screen, in which a special flashing or coloring process is performed by only the arrow of a direction to be the position of the called party 43, are shown by superposing on an image taken by the camera device 12.

By repetition of execution of the process from step A03, the ellipse E is displayed by superposing on the position of the called party 43 when the called party 43 stays within the range of the image taken by the camera device 12, the ellipse E is not shown and only the arrow of a direction to be the position of the called party 43 is shown for example by flashing when the called party 43 is out of the range of the image. This permits the location of the called party 43 to be determined in real time from the image by a more visual way.

FIGS. 6A to 6C illustrate transition states of the display screen of the display device 11 including the state shown in FIG. 5B corresponding to a change in camera direction of the camera device 12.

In the screen of the display device 11 of FIG. 6A, because the called party 43 is out of the range of the screen, it is expressed that the called party 43 is located beyond the right side of the screen by not showing the ellipse E indicating the location of the called party 43, but showing only the right arrow with the right arrow coloring and flashing.

When the camera device 12 of the CDMA terminal 10 is panned (moved) to the right direction according to the indication of the arrow, as shown in FIG. 6B, the same display state as the case shown in FIG. 5B can be obtained.

In the case of FIG. 6B, the indication of the arrow by specially flashing or coloring is not performed such that a specific direction of four sides of the screen is indicated, the ellipse E indicating the location of the called party 43 is superposed on the image picture. When the camera device 12 is further panned to the right direction from the display state of FIG. 6B, as shown in FIG. 6C, the ellipse E indicating the location of the called party 43 is shown while the ellipse is moving to the left end of the screen.

In the case of FIG. 6C, because the ellipse E is indicated, it is found that the called party 43 is located in the display range of the screen but at the most left side, the indication of the arrow by specially flashing or coloring is not performed such that one of the specific direction of right and left directions is indicated.

When the camera device 12 is moved to the upper direction with the display state in FIG. 6B, the ellipse E showing the location of the called party 43 is moved to the lower end of the screen, and when the camera device 12 is further moved to the upper direction, the ellipse E is eliminated and the lower arrow is shown by coloring and flashing instead of the ellipse E in order to inform that the called party 43 is located in the lower direction than the screen.

Consequently, in case that the ellipse E is not indicated on the screen of the display device 11, the camera direction of the camera device 12 is moved according to the direction of the arrow, and at a point of time that the ellipse E is indicated, the calling party 42 can move to approach the called party 43 while a target of the location of the called party 43 is recognized. Therefore, persons having the same CDMA terminals 10 can visually very easily recognize a location each other on screens.

In the above-described embodiment, it is explained that, according to an indication from the CDMA terminal 10 of the calling party 42, the GPS reception device 29 constituting the GPS unit 13 in the CDMA terminal 10 of the called party 43 also performs positioning operation, and the obtained position information is transmitted to the CDMA terminal 10 of the calling party 42. However, if a position is registered to the nearest base station by such kind of the CDMA terminal 10 and a present position is constantly registered at a certain period, the CDMA terminal 10 of the called party 43 can be grasped more rapidly. Thus, the navigation screens of real time as shown in FIGS. 6A, 6B and 6C can be displayed more quickly.

In the above-described embodiment, in step A04 of FIG. 4, the CDMA terminal of the calling party makes the GPS reception device 29 of the CDMA terminal of the called party activate and control for forwarding the position information is performed. However, it may be constituted that the process of step A04 is omitted and only a process receiving the position information transmitted from the CDMA terminal of the called party is performed in step A05 by the CDMA terminal of the calling party. In this case, from the CDMA terminal of the called party by itself activates the GPS reception device 29 to control transmission of the position information to the CDMA terminal of the calling party, or the service center apparatus makes the GPS reception device 29 of the CDMA terminal of the called party activate and forward the position information and then controls transmission of the received position information to the CDMA terminal of the calling party.

In the above-described embodiment, the system constitution is that the service center apparatus determinates whether the calling party 42 and the called party 43 are in a communication range of the same CDMA base station, only when the service center apparatus determinates that the calling party 42 and the called party 43 are in the same communication range, utilization of the navigation service (transition to the navigation mode) is permitted. However, it may be constituted that, without the service center apparatus, a communication line to the terminal of the called party is connected by a normal calling operation, the navigation mode is performed by receiving the position information from the terminal of the called party.

In the above-described embodiment, it is explained that the CDMA terminal 10 of the calling party 42 receives (obtains) the position information obtained by positioning operation of the CDMA terminal 10 of the called party 43 via the CDMA base station 41, the service center apparatus (not shown) or a CDMA communication network. However, according to the embodiment, since it is assumed that the calling party 42 and the called party 43 are close to each other to a degree that the called party 43 can be displayed in the display device 11, the position information may be directly received without a network by a radio communication from the CDMA terminal 10 of the called party 43.

In that case, burden of a communication common carrier can be reduced because it is not necessary to communicate via a network, while charge of users of the CDMA terminal 10 can be reduced because data communication charge is not generated.

In the above-described embodiment, the ellipse E indicating the position of the called party 43 is shown by superposing in a display position (that is to say, the display position of an object in the display screen) within the screen calculated in step A08. However, the display showing the position of the called party 43 is not limited to the ellipse, a display indicating the position of the called party 43 may be performed out of an area of an image display, and it is applicable that a display method is such that the position of the called party 43 can be recognized. Furthermore, a display which recognizes the position of the called party 43 in the display screen is not performed, and the CDMA terminal 10 determinates whether or not the target facility stays within the angle of view, incase that the CDMA terminal 10 determinates that the target facility stays within the angle of view, that the target facility stays within the angle of view may be informed only by a sound information, vibration information or visual information.

In the above-described embodiment, the display shown in FIG. 6A is performed in step A12 during determining that the called party 43 is not stayed within the angle of view in step A11. However, the process taking the image by the camera device 12 (step A10) or the process displaying the image by the display device 11 (step A12) may not be performed.

In the above-described embodiment, although the image picture is recorded (or transmitted) in step A14, the image is not recorded (or transmitted), but may be only displayed in step A13.

In the above-described embodiment, although the image is displayed in step A13, the image is not displayed, but may be recorded or transmitted (it is also possible to inform) in step A14. That is to say, it may be performed that the image is only recorded or only transmitted when the CDMA terminal of the calling party 42 determinates that the called party 43 stays within the angle of view.

In this case, it is also possible that the process taking the image (step A10) is not performed by the camera device 12 while the CDMA terminal of the calling party 42 determinates that the called party 43 is out of the angle of view in step A11, and the process obtaining the image in step A10 is performed to record or transmit the image only while the CDMA terminal of the calling party 42 determinates that the called party 43 stays in the angle of view in step A11.

In the above-described embodiment, in step A09 the display position of the ellipse is calculated to determinate whether or not the called party 43 stays within the angle of view (display range) by the obtained position information for displaying. However, for example in case that the called party 43 stays within the angle of view, the display is not performed such that the position of the called party 43 is recognized and only the process recording the image or the transmitting process or the informing process is performed, so that the process calculating the position of the called party 43 for displaying in step A09 may not be performed. The CDMA terminal of the calling party 42 may determinate whether or not the called party 43 stays within the angle of view by the position information of the called party 43, the position information of the calling party 42, information of an azimuth, angular information and information of the angle of view.

In the above-described embodiment, in step A09 the display position of the ellipse is calculated to determinate whether or not the called party 43 stays within the angle of view (imaging range) by the obtained position information for displaying. However, the CDMA terminal of the calling party 42 determinates at first whether or not the called party 43 stays within the angle of view by the position information of the called party 43, the position information of the calling party 42, information of an azimuth, angular information and information of an angle of view, the display position of the ellipse may be calculated in step A09 only in case that the CDMA terminal of the calling party 42 determinates that the called party 43 stays within the angle of view. Because of such constitution, it is not necessary to calculate the display position of the ellipse when the called party 43 is out of the angle of view, so that process burden of the CDMA terminal 10 can be reduced.

In the above-described embodiment, although it is explained that the processes shown in FIG. 4 are performed in the CDMA terminal 10 owned by the calling party 42, it is also possible that the processes shown in FIG. 4 are performed in the CDMA terminal 10 owned by the called party 43. Because of such constitution, both users look for each other while both users watch the display state of the display device 11 shown in FIGS. 6A to 6C, so that it is easier to find each other.

In the above-described embodiment, although it is explained that the navigation service system (navigation mode) is used for looking for the partner who is wanted to meet, a field of application is not limited to it, the navigate service system according to the invention may be used for finding out a missing person such as a runaway and a lost child or a wanted criminal.

In the above-described embodiment, although it is explained that both terminals of the calling party and the called party are a movable portable terminal, only the terminal of the calling party may be a surveillance camera fixed on a location. In this case, a present position (including an azimuth when a direction of the camera is fixed) of the terminal of the calling party is not changed so that the display position on the screen of the terminal of the called party as a surveillance object is calculated by using the position information stored in nonvolatile in advance to perform a display as shown in FIGS. 6A to 6C on a monitor screen in a monitoring room.

In the above-described embodiment, the horizontal and vertical position of the called party 43 in the display image is calculated to superpose on the image of the screen. However, it is regarded that there is rarely a case requiring the vertical position in practical use so that only the horizontal position of the called party 43 in the display image is calculated to superpose on the image for simplifying the constitution. When the vertical position is not considered, the camera device 12 is changed in the altitude direction without maintaining the direction of the camera device 12 horizontally, which causes a problem that the display position indicating a location of the called party 43 is not changed at all although the angle of view is changed.

In the above-described embodiment, the CDMA terminal 10 by itself receives the GPS information by the GPS reception device 29, and calculates a present position based on the received GPS information to obtain the position information itself. However, the CDMA terminal 10 may transmit the GPS information received by the GPS reception device 29 to the service center apparatus to calculate the present position of the CDMA terminal 10 based on the GPS information received by the service center apparatus.

In concrete, when the terminal of the called party transmits the GPS information received by the built-in GPS reception device 29 to the service center apparatus, the service center apparatus calculates the position of the terminal of the called party by the received GPS information to transmit the calculated position information to the terminal of the calling party. When the terminal of the calling party transmits the GPS information received by the built-in GPS receiving device 29 to the service center apparatus, the service center apparatus calculates the position of the terminal of the calling party by the received GPS information to transmit the calculated position information to the terminal of the calling party. The terminal of the calling party calculates the position of the terminal of the called party in the angle of view by the received position information of the terminal of the called party, the received position information of the calling party, the information of an azimuth obtained by the built-in azimuth sensor 14 and the angular information obtained by the built-in angle sensor 15.

In the above-described embodiment, although altitude data, which is calculated by the GPS information received by the GPS reception device 29 of the CDMA terminal 10, is utilized, it is also possible that an atmospheric pressure (altitude) sensor is provided in the CDMA terminal 10 to utilize altitude data obtained by the atmospheric pressure sensor.

Other embodiments of the invention will be described below. In the following embodiments, the same reference numerals are used for parts corresponding to the first embodiment to abbreviate a detailed description.

Second Embodiment

The second embodiment of the invention applicable to a navigation service system utilizing a portable terminal of a CDMA method, which is a kind of portable telephones, (hereinafter referred to "CDMA terminal") equipped with a GPS function will be described referring to the accompanying drawings.

A major schematic arrangement at open state of the foldable CDMA terminal 10 owned by a user is basically the same as that shown in FIG. 1, and the CDMA terminal 10 is also basically the same circuit configuration as that shown in FIG. 2. The same parts are designated by the same reference numerals and signs to abbreviate its illustration and explanation.

Figure 7:
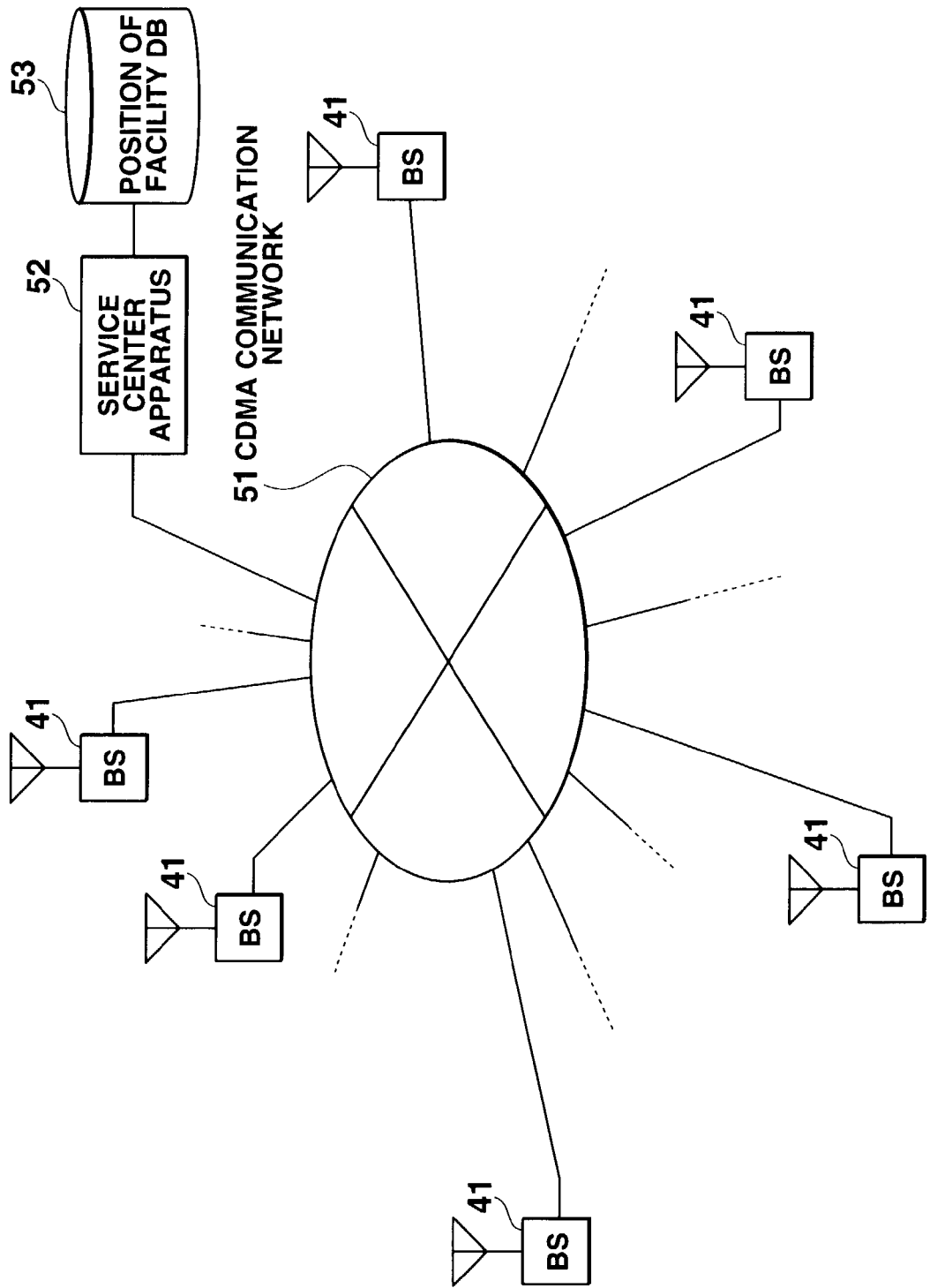
FIG. 7 shows a schematic arrangement of a total system according to the second embodiment of the invention.

According to FIG. 7, the whole arrangement of a system except the CDMA terminal 10 will be described. In FIG. 7, a plurality of CDMA base stations 41, 41, . . . are installed on a roof of a building, a steel tower or the like as shown in FIG. 3 and connected each other to form a CDMA communication network 51. A service center apparatus 52 operated by a communication common carrier is connected to the CDMA communication network 51.

The service center apparatus 52 has a database of facility locations (DB) 53 in which a plurality of precise position information are stored corresponding to a facility name. When data of the facility name is transmitted from the CDMA terminal 10 (not shown), the service center apparatus 52 refers to contents stored in the database of facility locations 53 to reply stored position information corresponding to data of the matched facility name to the CDMA terminal 10.

Operation of the embodiment will be explained below.

FIG. 8 shows contents of a process of facility guidance service to be performed corresponding to user's operation on the CDMA terminal 10. The process of facility guidance service is based on an operation program to be controlled mainly by the control device 30.

When the calling party 42 sets a navigate mode by operating a mode select key of the key input device 31, according to contents of input screen shown in the display device 11, the calling party 42 operates the key input device 31 to input the name of facility which becomes a target object (step B01).

Figure 9A:
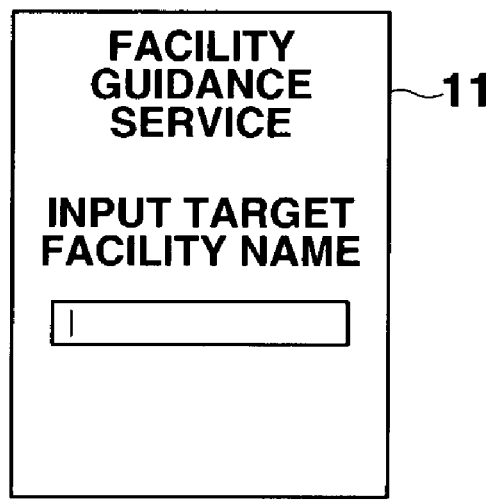
FIGS. 9A and 9B illustrate a display example on the portable terminal according to the second embodiment of the invention.

FIG. 9A illustrates an input screen shown in the display device 11 of the CDMA terminal 10 in step B01, following "Facility Guidance Service" of a service name and a guidance message suggesting input of a facility name, an input window is displayed for inputting actually the facility name.

When completion of input of a facility name is directed by operating a "speaking" key of the key input device 31, the CDMA terminal 10 performs a process calling the service center apparatus 52 and transmits data of the inputted facility name to the service center apparatus to inquire of the service center apparatus 52 about a location of the facility name (step B02).

The service center apparatus 52 receiving the inquiry from the CDMA terminal 10 searches the contents stored in the database of facility locations 53 to determinate whether or not the received facility name is registered. When it is determined that the received facility name is registered, the service center apparatus 52 replies the facility name and corresponding position information stored in the database of facility locations 53 to the CDMA terminal 10. The CDMA terminal 10 determinates whether or not the CDMA terminal 10 receives the position information transmitted from the service center apparatus 52 within a certain time, so that the CDMA terminal 10 determinates whether or not the inquired facility name is registered (step B03).

When the inquired facility name is not registered in the database of facility locations 53 and as a result the CDMA terminal 10 determinates that the corresponding position information can not be obtained, an error message that information concerning the facility of a search object is not registered in the database of facility locations 53 is displayed on the display device 11 (step B14), and the process is finished.

When the service center apparatus 52 determinates that the received facility name is not registered in the database of facility locations 53, it may be arranged that an error message is transmitted to the CDMA terminal 10 and the CDMA terminal 10 only displays the received message.

In step B03, the CDMA terminal 10 determinates that the position information is received (corresponding facility name is registered in the database of facility locations 53), immediately the received position information (latitude, longitude, altitude) is stored in a work area of the RAM (step B04).

The CDMA terminal 10 secures an active state of the GPS reception device 29 to obtain information of a present position (latitude, longitude, altitude) of the CDMA terminal 10 and stores the position information in the work area of the RAM (step B05). Then the CDMA terminal 10 secures an active state of the magnetic sensor 14 to obtain information of an azimuth to which the camera device 12 is directed at that time, and stores the obtained information in the work area of the RAM (step B06).

The CDMA terminal 10 secures an active state of the angle sensor 15 to obtain information of an angle (tilt angle) of an altitude direction to which the camera device 12 is directed at that time, and stores the obtained information in the work area of the RAM (step B07).

By the position information of the facility obtained in step B04, the position information where the user of the CDMA terminal 10 is at that time and the azimuth and angle to which the camera device 12 directs at that time, which are all stored in the work area of the RAM, a position of display (for example, an ellipse) showing a location of the facility as a target object in an image taken by the camera device 12 is calculated (step B08).

With respect to a calculation of a positional display of a target object for the image, since it is same as the contents shown in FIG. 5, the detailed explanation is abbreviated.

After the calculation of the display position of the ellipse in step B08, the solid-state imaging device 35 constituting the camera device 12 is driven to obtain an image signal. The image signal is performed a color process by the image pickup device 33 to obtain a digital value of the image signal to be stored in the work area of the RAM (step B09).

After obtaining the image signal, the CDMA terminal 10 determinates whether or not the facility as the target object is within a range of the angle of view taken by the camera device 12 and can be displayed on the screen of the display device 11, in a manner that the CDMA terminal 10 determinates by calculating whether or not the horizontal error angle α from an image center to a position of the facility exceeds the half horizontal angle of view θ, or whether or not the vertical error angle β from the image center to the position of the facility exceeds the half vertical angle of view θ' (step B10).

By calculating whether or not the shifted distance xr (or distance xd) exceeds the half of the distance Wr (breadth Wd), or whether or not the shifted distance xs (or distance xe) exceeds a half of the distance Ws (long We), whether or not the position of the target facility is stayed within the range of the angle of view may be determined.

Figure 9B:
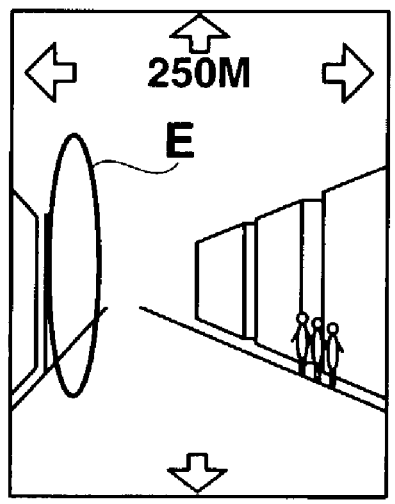

As a result of the calculation, when the CDMA terminal 10 determines that the position of the facility as the target object can be displayed on the screen of the display device 11, as shown in FIG. 9B, an ellipse E showing the position of the facility is displayed on a display position calculated in step B08, at the same time a distance to the user the target facility and an arrow, which shows a direction of the facility in case that the facility is out of the screen, are displayed by superposing on an image in the display device 11 (step B12). Then a present image stored in the work area of the RAM is recorded in the memory 32 (step B13), returning to the process of step B05 to repeat the same process. In step B13, it is also possible that the image is not recorded, but transmitted (forward) to an external image recording apparatus designated in advance via a communication network.

FIG. 9B illustrates a state that a position of the facility stays within the screen of the display device 11. The ellipse E showing the position of the facility, "250 M" of the distance to the facility and four arrows of four sides of the screen, which do not perform a special flashing or coloring because the facility stays in the screen, are shown by superposing on an image taken by the camera device 12.

On the other hand, as a result of the calculation in step B08, when the CDMA terminal 10 determined that the position of the facility can not be displayed on the screen of the display device 11 because the position of the facility is out of the screen, the distance to the facility and the arrow showing a direction which the facility is out of the screen are displayed by superposing on an image in the display device 11 (step B11), then returning to the process of step B05 to repeat the same process.

When the position of the facility is out of the screen of the display device 11, instead of not showing the ellipse E indicating the position of the facility, the distance to the facility and the four arrows of four sides of the screen, in which a special flashing or coloring process is performed by only the arrow of a direction to be the position of the facility, are shown by superposing on an image taken by the camera device 12.

By repetition of execution of the process from step B05, the ellipse E is displayed by superposing on the position of the facility when the facility stays within the range of the image taken by the camera device 12, and the ellipse E is not shown and only the arrow of a direction to be the position of the facility is shown for example by flashing when the facility is out of the range of the image. This permits the location of the facility to be determined in real time from the image by a more visual way. Consequently, even though a user of the CDMA terminal 10 is not acquainted at all with a place, the facility as the target object can be easily found out.

In the first and second embodiments, not only the position of the target object in the image but also the information showing the distance to the target object, the azimuth and the angle are displayed at the same time so that the user of the CDMA terminal 10 obtains more marks to find out efficiently the target object.

In the second embodiment, it is explained that the service center apparatus 52 has the database of facility locations 53 storing a plurality of position information corresponding to facility names, by inputting a facility name from the CDMA terminal 10 each time, the service center apparatus 52 searches the corresponding position information from database of facility locations 53 to transmit the information through the CDMA communication network 51. However, the embodiment is not limited to this constitution, it is also possible that, though storage capacity is limited, a plurality of facility names and the corresponding position information are stored in the memory 32 of the CDMA terminal 10 in advance, operation of the facility guidance service is performed by a process within the CDMA terminal 10 as the need arises.

In that case, all of the operations can be performed by processes within the CDMA terminal 10, so that burden of a communication common carrier can be reduced because it is not necessary for the service center apparatus 52 to arrange a system such as the database of facility locations 53. Further, charge of users of the CDMA terminal 10 can be reduced because data communication charge is not generated.

In this case, there is limitation of the plurality of the facility names whose position information can be searched according to the capacity of the memory 32 of the CDMA terminal 10. However, when the memory 32 is a medium such as a detachable memory card provided in the CDMA terminal 10, for example by providing the detachable medium selectively into the CDMA terminal 10 according to an area or contents of facility, the more detailed navigate operation can be realized even though the storage capacity of each medium is limited.

In the second embodiment, the position information of the target facility is obtained from the service center apparatus 52. However, the position information of the target facility may be obtained from other portable terminals or personal computers through a communication network or directly from other portable terminals or personal computers without the communication network, and the position information of the target facility (latitude, longitude, altitude) may be directly inputted by operating the key input device 31.

In the second embodiment, the ellipse E indicating the position of the facility is shown by superposing in a display position (that is to say, the display position of an object in the display screen) within the screen calculated in step B08. However, the display showing the position of the facility is not limited to the ellipse, a display indicating the position of the facility may be performed out of an area of an image display, and it is applicable that a display method is such that the position of the facility can be recognized. Furthermore, a display that recognizes the position of the target facility in the display screen is not performed, and the CDMA terminal 10 determinates whether or not the target facility stays within the angle of view. When the CDMA terminal 10 determinates that the target facility stays within the angle of view, the fact that the target facility stays within the angle of view may be informed only by a sound information, vibration information or visual information.

In the second embodiment, the display process is performed in step B11 during determining that the target facility is not stayed within the angle of view in step B10. However, the process taking the image by the camera device 12 (step B09) or the process displaying the image by the display device 11 (step B11) may not be performed.

In the second embodiment, although the image is recorded in step B13, the image is not recorded, but may be only displayed in step B12.

In the second embodiment, although the image is displayed in step B12, the image is not displayed, but may be recorded or transmitted (it is also possible to inform) in step B13. That is to say, it may be performed that the image is only recorded or only transmitted when the CDMA terminal 10 determinates that the target facility stays within the angle of view.

In this case, it is also possible that the process taking the image (step B09) is not performed by the camera device 12 while the CDMA terminal 10 determinates that the target facility is out of the angle of view in step B10, and the process obtaining the image in step B09 is performed to record or transmit the image only while the CDMA terminal 10 determinates that the target facility stays in the angle of view in step B10.

In the second embodiment, in step B08 the display position of the ellipse is calculated to determinate whether or not the target facility stays within the angle of view by the obtained position information for displaying. However, for example when the target facility stays within the angle of view, the display is not performed such that the position of the target facility is recognized and only the process recording the image or the transmitting process or the informing process is performed, so that the process calculating the position of the target facility for displaying in step B08 may not be performed. The CDMA terminal 10 may determinate whether or not the target facility stays within the angle of view by the position information of the CDMA terminal 10, information of an azimuth, angular information and information of the angle of view.

In the second embodiment, in step B08 the display position of the ellipse is calculated to determinate whether or not the target facility stays within the angle of view (imaging range) by the obtained position information for displaying. However, the CDMA terminal 10 determinates at first whether or not the target facility stays within the angle of view by the position information of the target facility, the position information of the CDMA terminal 10, information of an azimuth, angular information and information of the angle of view, the display position of the ellipse may be calculated in step B08 only in case that the CDMA terminal 10 determinates that the target facility stays within the angle of view. Because of such constitution, it is not necessary to calculate the display position of the ellipse when the target facility is out of the angle of view, so that processing burden of the CDMA terminal 10 can be reduced.

In the second embodiment, although the horizontal and vertical position of the target facility in the display image is calculated to superpose on the image of the screen, it is regarded that there is rarely a case requiring the vertical position in practical use. Only the horizontal position of the target facility in the display image is calculated to superpose on the image for simplifying the constitution. When the vertical position is not considered, the camera device 12 is changed in the altitude direction without maintaining the direction of the camera device 12 horizontally, which causes a problem that the display position indicating a location of the target facility is not changed at all although the angle of view is changed. That is to say, for example, the problem is created in case that the target facility is a store or a company on a 23rd floor of a multistory building.

In the second embodiment, the CDMA terminal 10 by itself receives the GPS information by the GPS reception device 29 and calculates a present position by the received GPS information to obtain the position information itself. However, the CDMA terminal 10 may transmit the GPS information received by the GPS receiving device 29 to the service center apparatus 52 to calculate the present position of the CDMA terminal 10 based on the GPS information received by the service center apparatus 52.

In the second embodiment, altitude data, which is calculated based on the GPS information received by the GPS reception device 29 of the CDMA terminal 10, is utilized. However, it is also possible that an atmospheric pressure (altitude) sensor is provided in the CDMA terminal 10 to utilize altitude data obtained by the atmospheric pressure sensor.

Third Embodiment

The third embodiment of the invention applicable to a navigation service system utilizing a portable terminal of a CDMA method, which is a kind of portable telephones, (hereinafter referred to "CDMA terminal") equipped with a GPS function will be described referring to the accompanying drawings.

The embodiment, in the navigation service displaying a position of a target facility on a screen as same mode as the second embodiment, performs calculation of a display position by not the CDMA terminal 10 but the service center apparatus 52. The same explanation described in the second embodiment can be applied to the third embodiment for other arrangement.

A characteristically schematic arrangement at open state of the foldable CDMA terminal 10 owned by a user is basically the same as that shown in FIG. 1, and the CDMA terminal 10 is also basically the same circuit configuration as that shown in FIG. 2. The same parts are designated by the same reference numerals and signs to abbreviate its illustration and explanation.

Figure 10:
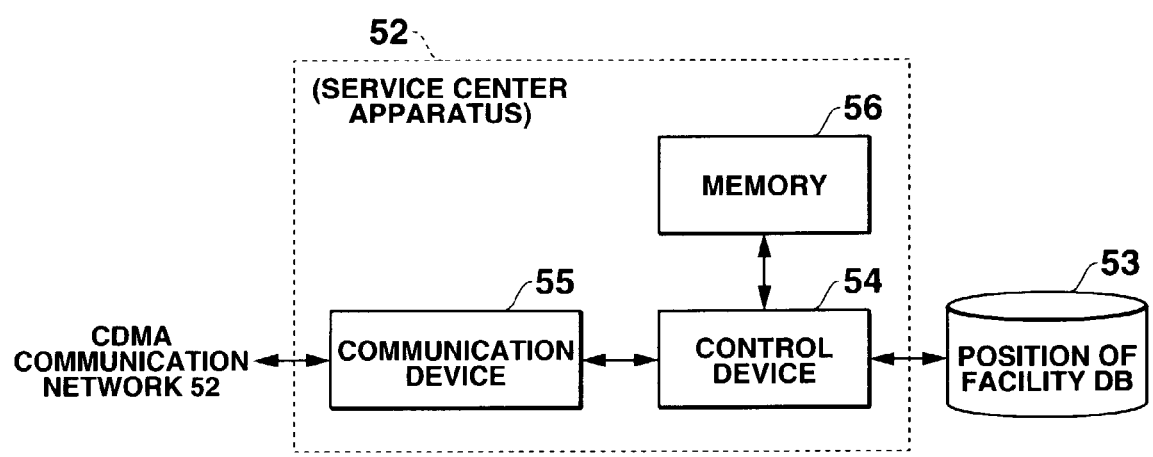
FIG. 10 is a block diagram showing a circuit configuration of a service center apparatus according to the third embodiment of the invention.

FIG. 10 shows a concrete configuration of the service center apparatus (target position search apparatus) 52 shown in FIG. 7.

A communication device 55 transmits and receives information to and from the CDMA terminal 10 via the CDMA base station 41 and the CDMA communication network 51.

A control device 54 comprises CPU and controls the whole service center apparatus by a predetermined operation program stored in a memory 56 described below.

The memory 56 stores in a nonvolatile manner control programs for a communication control, a transmission and reception control of communication data, and a calculation of a display position and an operation program of the control device 54 including various controls for operating the service center apparatus 52. A part of the memory 56 is allocated to a work memory area.

Operation of the embodiment will be described below.

Figure 11A:
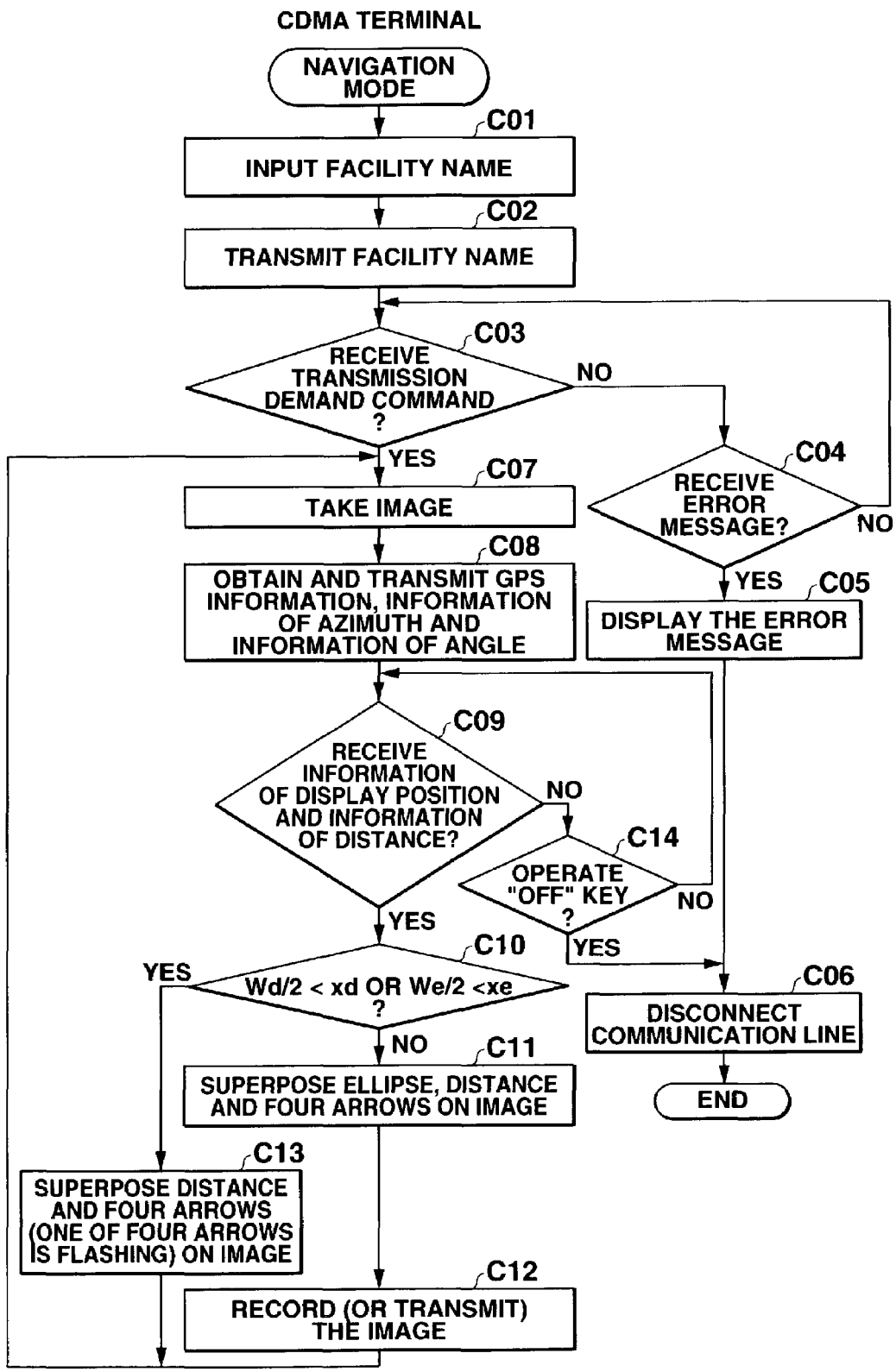

FIG. 11A shows contents of a process of a facility guidance service to be performed by operation of a user on the CDMA terminal (target position search apparatus) 10, it is based on an operation program controlled mainly by the control device 30.

At first, when the calling party 42 sets to a navigate mode by operating the mode select key of the key input device 31, according to contents of an input screen (FIG. 9A) displayed in the display device 11, a facility name as a target object is inputted by operating the key input device 31 (step C01).

When completion of the input of the facility name is directed by operating the "speaking" key of the key input device 31, a calling process to the service center apparatus 52 is performed. The inputted data of the facility name are transmitted to the service center apparatus 52, thereby a location of the facility name is inquired of the service center apparatus (step C02).

By this inquiry, the CDMA terminal 10 determinates whether or not information which the navigate service is available, that is to say, a transmission demand command for demanding transmission of GPS information, information of an azimuth and angular information is received (step C03), and determinates whether or not information which the navigation service is not available is received (step C04).

When the CDMA terminal 10 determinates that an error message is received in step C04, the CDMA terminal 10 displays the received message that information concerning the facility as the target object is not registered in the database of facility locations 53 on the display device 11 (step C05), disconnects a communication line between the service center apparatus 52 (step C06), and finishes the process.

When it cannot be determined that an error message is received in step C04, the process is returned to step C03.

On the other hand, the CDMA terminal 10 determinates that the transmission demand command is received in step C03, the solid-state imaging device 35 constituting the camera device 12 is driven to obtain an image signal. The image signal is subject to a color process by the image pickup device 33 to obtain a digital value of the image signal, and the digital value is stored in a work memory area of the memory 56 (step C07).

After step C07, the GPS information, the information of an azimuth and the angular information of the CDMA terminal 10 is taken by the GPS reception device 29, the magnetic sensor 14 and the angle sensor 15 within the CDMA terminal 10 to transmit the information of the CDMA terminal to the service center apparatus 52 (step C08).

Responsive to the transmission of the information of the CDMA terminal 10 in step C08, the CDMA terminal 10 determinates whether or not information of a display position (concretely information of distances from a center of the image to the target facility xd and xe), which is calculated by the service center apparatus 52 according to the information the CDMA terminal 10 and the position information of the target facility, showing the position of the target facility on the image and information of a distance from the CDMA terminal 10 to the target facility are received (step C09).

When the CDMA terminal 10 determinates that the information of the display position is received, the CDMA terminal 10 determinates whether or not the facility as the target object is within a range of the angle of view taken by the camera device 12 and can be displayed on the screen of the display device 11, in a manner that the CDMA terminal 10 determinates by calculating whether or not the received information of the distance xd exceeds the half of the breadth Wd of the display screen, or whether or not the received information of the distance xe exceeds the half of the long We of the display screen (step C10).

When it is determined that the position of the facility can be displayed on the screen of the display device 11, as shown in FIG. 9B, an ellipse E showing the position of the facility is displayed on a display position based on the information of the distances xd and xe received in step C09, at the same time a distance to the target facility and an arrow, which shows a direction of the target facility in case that the target facility is out of the screen, are displayed by superposing on the image in the display device 11 (step C11). Then a present image stored in the work memory area of the memory 56 is recorded in a storage area of the memory 56 (step C12), returning to the process of step C07 to repeat the same process. In step C12, it is also possible that the image is not recorded, but transmitted (forward) to an external image recording apparatus designated in advance through a communication network.

On the other hand, in step C10, when the CDMA terminal 10 determined that the position of the facility can not be displayed on the screen of the display device 11 because the position of the facility is out of the screen, the received information of the distance to the facility and the arrow showing a direction which the facility is out of the screen are displayed by superposing on an image in the display device 11 (step C13), then returning to the process of step C07 to repeat the same process.

In case that operation of an "off" key of the key input device 31 is detected in step C14 during repeat performance of the process of steps C07 to C13, the communication line between the service center apparatus 52 is disconnected (step C06) and the process is finished.

FIG. 11B shows contents of a process of the facility guidance service performed on the service center apparatus 52. The contents are based on an operation program controlled mainly by the control device 54.

At first, in the communication device 55, there is reception for inquiry of the navigate service from the CDMA terminal 10, whether a facility name is received or not is determined (step C21).

When it is determined that the facility name is received, the service center apparatus 52 searches memory contents of the database of facility locations 53 (step C22), determinates whether or not the received facility name is registered (step C23). When it is determined that the received facility name is registered, the service center apparatus 52 takes the facility name and the corresponding position information stored in the database of facility locations 53 from the database of facility locations 53 to store it in the work memory area of the memory 56 (step C24).

A command for demanding transmission of GPS information, information of an azimuth and angular information, which are needed for calculating the display position of the target facility, is transmitted from the communication device 55 to the CDMA terminal 10 (step C25).

In step C23, when it is determined that the received facility name is not registered, the service center apparatus 52 transmits information, which the information concerning the facility as the search object is not registered in the database of facility locations 53 and the navigate service can not be utilized (including an error message), to the CDMA terminal 10 (step C31), disconnects the communication line between the service center apparatus 52 (step C32), and finishes the process.

In step C26, responsive to the transmitting demand in step C25, the service center apparatus 52 determinates whether or not the GPS information, the information of the azimuth and the angular information transmitted from the CDMA terminal 10 are received.

When receiving the GPS information, the information of the azimuth and the angular information, the service center apparatus 52 stores temporarily the information in the work memory area of the memory 56, then calculates a present position (latitude, longitude, altitude) of the CDMA terminal 10 based on the GPS information to store the obtained position information in the work memory area of the memory 56 (step C27).

By the position information of the target facility, the position information, the information of the azimuth and the angular information of the CDMA terminal 10, which are all stored in the work memory area of the memory 56, a position of display showing a location of the facility as a target object in an image taken by the camera device 12 of the CDMA terminal 10 is calculated (step C28).

With respect to a calculation of a positional display of a target object for the image, since it is same as the contents shown in FIG. 5, the detailed explanation is abbreviated. However, the horizontal angle of view 2θ and vertical angle of view 2θ' of the solid-state imaging device 35 (optical lens system 34) of the CDMA terminal 10, and the breadth Wd and long We of the screen of the display device 11 are common to all CDMA terminals, those are stored in advance in a certain area of the memory 56. When there is a difference in the angle of view and the screen size among various kinds of CDMA terminals 10 equipped with a camera, information of the angle of view and information of the screen size are needed to be transmitted from the CDMA terminal 10 before calculating the display position. Furthermore, in case of the CDMA terminal 10 equipped with a zoom camera, it is necessary that the information of the angle of view is transmitted from the CDMA terminal 10 according to every change of zoom ratio by a user.

After calculating the display position of an ellipse (horizontal distance xd and vertical distance xe from the center of the screen) in step C28, the calculated information of the display position and distances are transmitted by the communication device 55 to the CDMA terminal 10 (step C29).

The service center apparatus 52 determinates whether or not the communication line is disconnected by operating the "off" key of the key input device 31 of the CDMA terminal 10 (step C30). When the communication line is connected, the process returns to step C26 and repeat the process of steps C26 to C30 till the communication line is disconnected.

Thus, since the calculation of the display position is performed by not the CDMA terminal 10 but the service center apparatus 52, processing burden of the CDMA terminal 10 can be reduced. It is not necessary that the CDMA terminal 10 has a CPU having high performance, which permits costs for realizing the navigation service to be vastly reduced.

In the third embodiment, it is arranged that the GPS information received by the GPS receiving device 29 of the CDMA terminal 10 is transmitted to the service center apparatus 52 and the service center apparatus 52 calculates a position based on the received GPS information. However, it may be arranged that the CDMA terminal 10 calculates the position by the GPS information received based on the GPS reception device 29 and the obtained position information is transmitted to the service center apparatus 52.

In the third embodiment, the CDMA terminal 10 receives the information of the display position transmitted from the service center apparatus 52 and performs the process of steps C10 to C13 in FIG. 11A based on the information of the display position. However, it is also possible that the determination of step C10 is performed by the service center apparatus 52, by this determination, a command for flashing an optional arrow, a command for directing record or transmission of an image, a command for directing a display of an ellipse and a command for directing information are transmitted to the CDMA terminal 10 as the need arises, and the CDMA terminal 10 only performs a process responsive to a received command.

Furthermore, it is also possible that, when the determination in step C10 is performed by the service center apparatus 52, by this determination result, an image taken away the image from the display shown in FIG. 6A to FIG. 6C, that is to say, the image including only the arrows, the distance and the ellipse is formed. The obtained image is transmitted to the CDMA terminal 10, and the CDMA terminal 10 only performs a display process superposing the received image on the image taken by the camera device 12.

Furthermore, it is also possible that, when the determination in step C10 is performed by the service center apparatus 52, the determination is transmitted to the CDMA terminal 10, and the CDMA terminal 10 only performs the process of steps C11 to C13 in FIG. 11A responsive to a received determination.

Furthermore, it is also possible that, when the determination in step C10 is performed by the service center apparatus 52, for example, while the target facility stays within the angle of view, if a display in which the target facility is recognized is not performed in the display device 11 and a recording process of the image, a transmitting process or an informing process is only performed, the calculating process of the display position of the target facility in step C28 is not performed, the service center apparatus 52 determinates whether or not the target facility stays within the angle of view by the position information of the target facility, and the position information, the information of the azimuth, the angular information and the information of the angle of view of the CDMA terminal 10.

In the third embodiment, there is described the case that the calculation of the display position is performed by not the CDMA terminal 10 but the service center apparatus 52 in the navigation service showing the position of the target facility on the screen as same as the second embodiment. However, it is also possible that the calculation of the display position is performed by not the CDMA terminal 10 but the service center apparatus 52 is described in the navigation service showing the position of the called party 43 on the screen as same as the first embodiment.

It is possible that the service center apparatus 52 receives one by one the position information (or GPS information) transmitted from the CDMA terminal 10 owned by the called party 43 and the position information (or GPS information), the information of the azimuth and the angular information transmitted from the CDMA terminal 10 owned by the calling party 42, calculates one by one the position of the called party 43 on the display screen by the received information, and transmits one by one the obtained information of the display position to the CDMA terminal 10 owned by the calling party 42.

Fourth Embodiment

The fourth embodiment of the invention applicable to a navigation service system utilizing a portable telephone (hereinafter referred to "PHS terminal") corresponding to PHS (Personal Handyphone System: the second generation wireless telephone system) will be described referring to the accompanying drawings.

In the PHS method, a very small micro cell system in which a covering area of each base station (CS) is a minimum radius of about 100 m is adopted, when a PHS terminal registers its location in the nearest base station, a center side can recognize the location of the PHS terminal by an identification code of the base station whose location is registered.

In the embodiment, the PHS terminal has almost the same functional configuration as that of the CDMA terminal 10 shown in FIG. 1. The same parts are designated by the same reference numerals and signs to abbreviate its illustration and explanation.

A circuit configuration is also the same as that of the CDMA method shown in FIG. 2 except there is a difference of a circuit of a communication system between the PHS method and the CDMA method, the same parts are designated by the same reference numerals and signs to abbreviate its illustration and explanation.

Operation of the embodiment will be described below.

Figure 12:
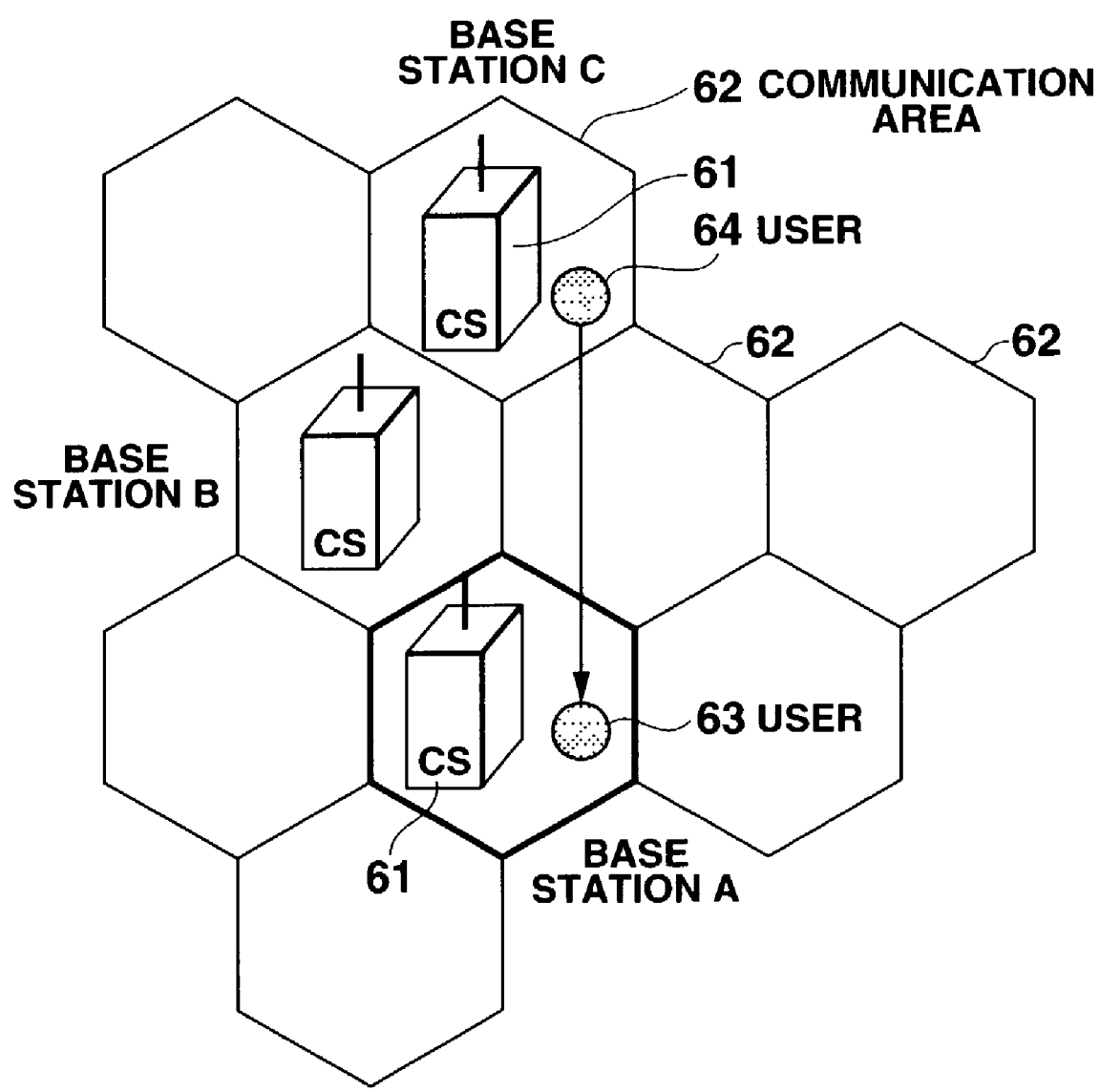
FIG. 12 illustrates a schematic image of operation according to the fourth embodiment of the invention.

FIG. 12 shows an example of operational environment of the system. In the micro cell system in which each communication area 62, 62, . . . of a small scale including the PHS base station 61, 61, . . . disposed on a roof of a building or a telephone booth closely is closely adjacent, it is assumed that two PHS terminals of users 63 and 64, who are friends, are connected to a PHS communication network (not shown here) and a service center apparatus operated by a communication common carrier which manages the PHS communication network, the user 64 is moving toward the user 63, the user 63 calls the user 64 and searches a location of the user 64 by the PHS terminal.

Figure 13:
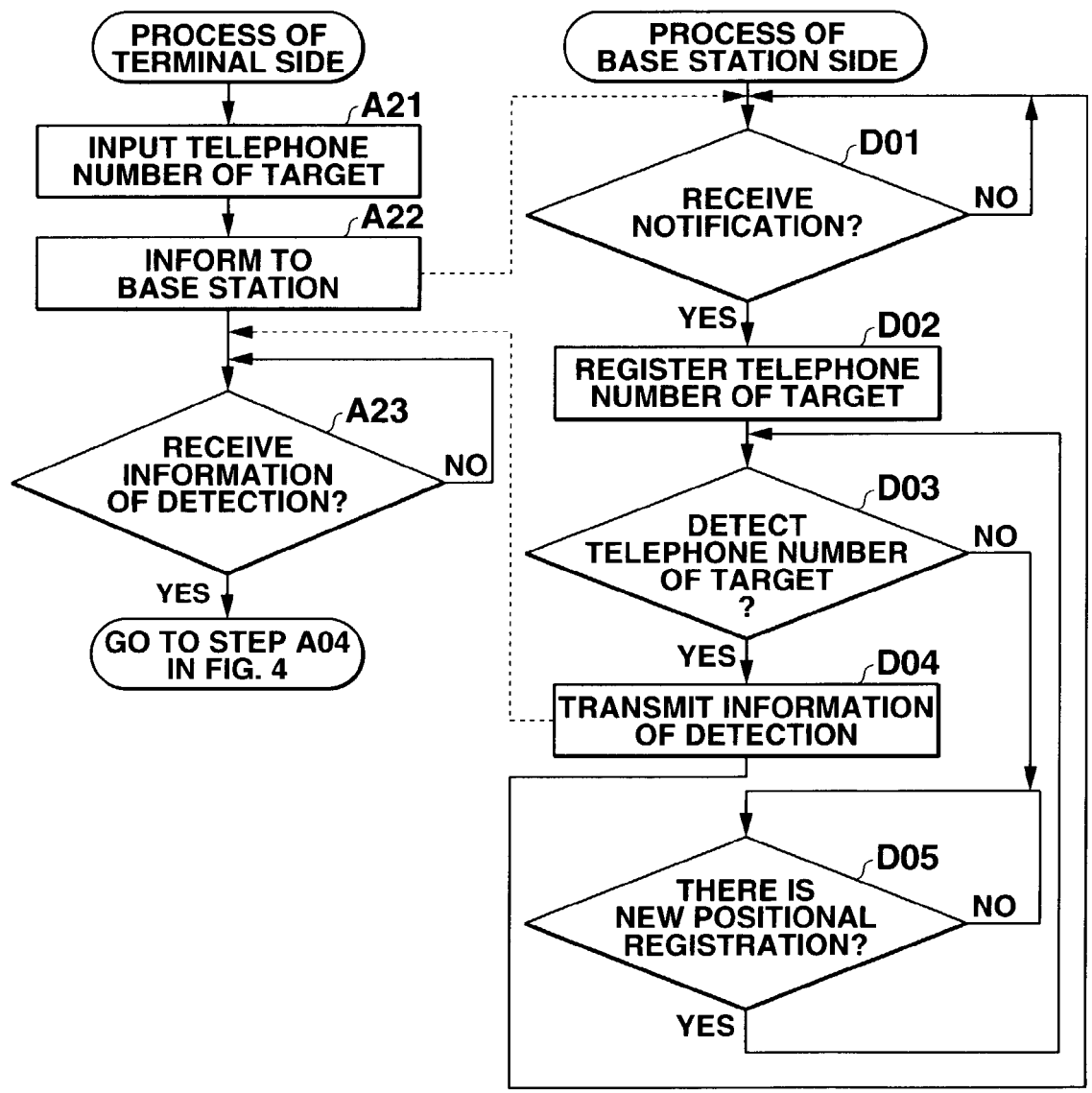
FIG. 13 is a flowchart showing an operational process at a portable terminal and a nearest base station according to the fourth embodiment of the invention.

FIG. 13 shows contents of a process of a positional search service to be performed between the PHS terminal owned by the user 63 as a calling party side and the base station 61 in which a positional registration is performed by the PHS terminal owned by the user 63 at that point.

In the PHS terminal, a fixed positional search mode is operated by direction, according to contents of a screen indicated in the display device 11, a telephone number of the PHS terminal of the user 64 as a called party of an object is inputted (step A21), and calling is performed to the nearest PHS base station 61 where the PHS the positional registration is performed by the PHS terminal of the user 63 (step A22).

The PHS terminal of the user 63 is placed in a standby condition till information that the positional registration of the called party is detected is received from the PHS base station 61 (step A23).

In the PHS base station 61, the PHS base station 61 is on standby till notice of the positional search service is transmitted from the PHS terminal that has performed the positional registration (step D01). At the point when the notice is transmitted, the PHS base station 61 registers the PHS telephone number of the user 64 as the called party that should search its position by the notice (step D02).

The PHS base station 61 determinates whether or not the PHS terminal is detected in such a manner that the PHS base station 61 determinates whether or not the PHS terminal of the registered telephone number is stayed within the communication area 62 covered by the PHS base station 61 at that time and performed the positional registration already (step D03). When it is determined that the PHS terminal is not performed the positional registration yet, the PHS base station 61 is on standby till the positional registration is newly performed by a PHS terminal (step D05).

In step DOS, when the PHS base station 61 determinates that the positional registration is newly performed by a PHS terminal, the process is returned to step D03 to determinate whether or not the PHS terminal is the registered telephone number.

By repetition of the process determining whether or not the PHS terminal is the belongings of the user 64 whenever the positional registration is newly performed by a PHS terminal, the PHS base station 61 is on standby till the user 63 and the user 64 exist within the same communication area 62 of the PHS base station 61.

When the user 64 comes in the same communication area 62 as the user 63 by movement of the user 64, the PHS base station 61 determinates that the telephone number of the object is detected in step D03, transmits information of detection to the PHS terminal owned by the user 63 (step D04), then returns to the standby process of step D01 again for preparing new utilization of the service.

After the PHS terminal of the user 63 which has received the information of the detection from the PHS base station 61 determinates it in step A23, the PHS terminal of the user 63 performs the same processes from step A04 in FIG. 4 to display the location of the PHS terminal of the user 64 by superposing on an image taken by the camera device 12.

As described above, the PHS base station 61 control so as not to start on a display for positional search till the PHS base station 61 determinates that the user 63 and the user 64 are in the same area. Therefore, the PHS terminal of the user 63 start on the positional search operation after the user 64 as the called party is in some extent recognized by the user 63.

Accordingly, in the PHS terminal, electrical power consumption and communication charge are reduced, which enable the positional search service to be used economically. In the base station or the system side, communication traffic can be also reduced.

In the fourth embodiment, it is explained that the invention is applied to the navigation service showing the called party 43 on the screen as the same mode as the first embodiment. However, the invention may be also applied to a navigation service showing a location of a target facility as the same mode as the second and third embodiments.

In the fourth embodiment, the navigation service system determinates whether or not the user 63 approaches the user 64 in a manner that the user 63 and the user 64 is in the same area 62 or not. However, it is also possible that, by calculating a distance between the user 63 and the user 64 from the position information of the user 63 and the position information (target facility is also possible) of the user 64, the navigation service system determinates whether or not the user 63 approaches the user 64 in a manner that the obtained distance by the calculation is more than a certain distance or not.

In the fourth embodiment, it is explained that the PHS terminal includes positioning means by the GPS unit 13. However, even though the PHS terminal dare not include the positioning means such as the GPS unit 13 and not perform a process such that a location of the other party is superposed on an image, that a called party exists near a calling party can be recognized because timing when a PHS terminal of the called party enters into the same communication area 62 can be learned.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A target position search apparatus comprising:
   a first information obtaining section that performs an obtaining operation including obtaining position information of a target object, and imaging angle-of-view information of an image pickup device;
   a second information obtaining section that performs an obtaining operation including obtaining imaging position information and imaging azimuth information of the image pickup device;
   a calculation section which performs a calculation operation including calculating a position of the target object in an image obtained by the image pickup device based on the position information of the target object and the imaging angle-of-view information of the image pickup device which are obtained by the first information obtaining section, and the imaging position information and imaging azimuth information of the image pickup section which are obtained by the second information obtaining section;
   an output section that performs an outputting operation including outputting information showing the calculated position of the target object in the obtained image;
   an instruction section that instructs timing for initiating a series of operations for locating the position of the target object; and
   a first control section that performs the series of operations in accordance with the timing instructed by the instruction section, said series of operations including the obtaining operation by the second information obtaining section, the calculation operation by the calculation section, and the output operation by the output section.

2. The apparatus according to claim 1, wherein the obtaining operation of the second information obtaining section further comprises obtaining imaging angle information of the image pickup device, and
   wherein the calculation section calculates the position of the target object in the image obtained by the image pickup device based on the position information of the target object and the imaging angle-of-view information of the image pickup device which are obtained by the first information obtaining section, and the imaging position information, the imaging azimuth information, and the imaging angle information of the image pickup device which are obtained by the section information obtaining section.

3. The apparatus according to claim 1, further comprising a display which displays the image obtained by the image pickup device;
   wherein the display and the image pickup device are provided in a portable body of the apparatus, and the output device outputs the information showing the position of the target object in the image to the display.

4. The apparatus according to claim 3, further comprising a determination section which determines whether or not the target object stays within an angle of view of the image pickup device based on the position information of the target object, and the imaging position information, imaging azimuth information, and imaging angle-of-view information of the image pickup device;
   wherein the output device outputs display information showing a direction of the target object to the display when the determination device determines that the target object does not stay within the angle of view of the image pickup device.

5. The apparatus according to claim 3, at further comprising a transmission section which transmits information concerning the optional target object designated by the designation section to a base station, which is connected to a portable body of the apparatus via a wireless communication network, and which stores position information corresponding to the information concerning the target object;
   wherein the first information obtaining section receives the position information corresponding to the information concerning the target object transmitted by the transmission section, said position information being transmitted from the base station in accordance with the transmission by the transmission section, thereby obtaining the position information of the target object.

6. The apparatus according to claim 1, further comprising a designation section which designates an optional target objects;
   wherein the first information obtaining section obtains the position information of the optional target object designated by the designation device.

7. The apparatus according to claim 1, wherein the imaging position information and the imaging azimuth information of the image pickup device are transmitted to the second information obtaining section from an external apparatus that includes the image pickup device, such that the second information obtaining section thereby obtains the imaging position information and imaging azimuth information, and wherein the output section outputs the information showing the position of the target object in the image to the external apparatus that includes the image pickup device.

8. The apparatus according to claim 1, wherein the position information of the target object is transmitted from the target object, which is an external apparatus, to the first information obtaining section such that the first information obtaining section thereby obtains the position information of the target object.

9. The apparatus according to claim 1, further comprising a determination section which determines whether or not the target object and the camera are in an approach state;

wherein the calculation section calculates the position of the target object in the image obtained by the image pickup device when the determination section determines that the target object and the camera are in the approach state.

10. The apparatus according to claim 1, wherein, when the series of operations is completed, the instruction device instructs another said series of operations to be initiated, such that the series of operations for locating the position of the target object is periodically performed.

11. A target position search apparatus comprising:
an image pickup device that performs an image pickup operation including picking up an image;
a display that performs a displaying operation including displaying the image picked up by the image pickup device;
an information obtaining section that performs an obtaining operation including imaging position information and imaging azimuth information of the image pickup device;
a transmission device that performs a transmission operation including transmitting the imaging position information and the imaging azimuth information of the image pickup device to an external apparatus;
a reception section which performs a reception operation including receiving position information of a target object in the image picked up by the image pickup device, said position information being calculated by the external apparatus based on: (i) the imaging position information and the imaging azimuth information transmitted from the transmission section, (ii) position information of the target object, and (iii) imaging angle-of-view information of the image pickup device; and
an output section which performs an outputting operation including outputting display information corresponding to the position information of the target object in the image received by the reception section to the display;
an instruction section that instructs timing for initiating a series of operations for locating the position of the target object; and
a control section that performs the series of operations in accordance with the timing instructed by the instruction section, said series of operations including the image pickup operation by the image pickup device, the displaying operation by the display, the obtaining operation by the information obtaining section, the transmission operation by the transmitting section, the reception operation by the receiving section, and the outputting operation by the output section.

12. A target position search apparatus comprising:
an information obtaining section which performs an obtaining operation including obtaining position information of a target object, and obtaining imaging position information, imaging azimuth information, and imaging angle-of-view information of an image pickup device;
a determination section which performs a determining operation including determining whether or not the target object stays within an angle of view of the image pickup device based on the position information of the target object and the imaging position information, the imaging azimuth information, and the imaging angle-of-view information of the image pickup device;
a first control section that performs a predetermined process in accordance with a result of determination made by the determination section;
an instruction section that instructs timing for initiating a series of operations for locating the position of the target object; and
a second control section that performs the series of operations in accordance with the timing instructed by the instruction section, said series of operations including the obtaining operation by the information obtaining section, the determining operation by the determining section, and the predetermined process by the first control section.

13. The apparatus according to claim 12, wherein the second control section performs an informing process when the determination section determines that the target object stays within the angle of view of the image pickup device.

14. The apparatus according to claim 12, wherein the second control section performs a process of recording an image taken by the image pickup device when the determination section determines that the target object stays within the angle of view of the image pickup device.

15. The apparatus according to claim 12, wherein the second control section performs a process of external transmission of an image taken by the image pickup device when the determination section determines that the target object stays within the angle of view of the image pickup device.

16. The apparatus according to claim 12, wherein the second control section transmits information corresponding to a result of determination made by the determination section to an external apparatus including the image pickup device.

17. A target position search apparatus comprising:
an image pickup device that performs an image pickup operation including picking up an image;
a display that performs a displaying operation including displaying the image picked up by the image pickup device;
an information obtaining device that performs an obtaining operation including obtaining imaging position information and imaging azimuth information of the image pickup device;
a transmission section that performs a transmission operation including transmitting the imaging position information and the imaging azimuth information of the image pickup device that are obtained by the information obtaining section to an external apparatus which determines whether or not the target object stays within an angle of view of the image pickup device based on the imaging position information, the imaging azimuth information, position information of a target object, and imaging angle-of-view information of the image pickup device;
a reception section which performs a reception operation including receiving information showing a result of a determination made by the external apparatus;
a first control section that performs a predetermined process in accordance with the information showing the result of determination received by the reception section;
an instruction section that instructs timing for initiating a series of operations for locating the position of the target object; and
a second control section that performs the series of operations in accordance with the timing instructed by the instruction section, said series of operations including the image pickup operation by the image pickup device, the displaying operation by the display, the obtaining operation by the information obtaining section, the transmission operation by the transmitting section, the reception operation by the reception section, and the predetermined process by the first control section.

18. A computer readable medium having a computer readable program code stored thereon, the computer readable program code being executable by a computer to cause the computer to perform processes comprising:
obtaining position information of a target object and imagine angle-of-view information of an image pickup device;
obtaining imaging position information and imaging azimuth information of the image pickup device;
calculating a position of the target object in an image obtained by the image pickup device based on the position information of the target object, the imaging position information, the imaging azimuth information, and the imaging angle-of-view information of the image pickup device;
outputting information showing the calculated position of the target object in the image;
instructing timing for initiating a series of operations for locating the position of the target object; and
performing the series of operations in accordance with the instructed timing, said series of operations including the obtaining of the imaging position information and the imaging azimuth information of the image pickup device, the calculating, and the outputting.

19. A target position search method comprising:
instructing timing for initiating a series of operations for locating a position of a target object;
obtaining position information of a target object, and imaging position information, imaging azimuth information, and imaging angle-of-view information of an image pickup device, in accordance with the instructed timing;
calculating a position of the target object in an image obtained by the image pickup device based on the position information of the target object, and the imaging position information, the imaging azimuth information, and imaging the angle-of-view information of the image pickup device, in accordance with the instructed timing; and
outputting information showing the calculated position of the target object in the image, in accordance with the instructed timing.

20. A target position search apparatus comprising:
an information obtaining section that obtains position information of a target object, and imaging position information, imaging azimuth information, and imaging angle-of-view information of a camera;
a calculation section that calculates a position of the target object in an image obtained by the camera based on the position information of the target object, and the imaging position information, imaging azimuth information, and imaging angle-of-view information of the camera which are obtained by the information obtaining section;
a display that displays the image obtained by the camera;
an output section that outputs information showing the calculated position of the target object in the image to the display; and
a determination section which determines whether or not the target object stays within an angle of view of the camera based on the position information of the target object, and the imaging position information, imaging azimuth information, and imaging angle-of-view information of the camera;
wherein the output section outputs display information showing a direction of the target object to the display when the determination section determines that the target object does not stay within the angle of view of the camera.

21. The apparatus according to claim 20, wherein the image pickup device and the display are provided in a portable body of the apparatus.

22. The apparatus according to claim 20, further comprising a designation section which designates an optional target object;
wherein the information obtaining section obtains the position information of the optional target object designated by the designation section.

23. The apparatus according to claim 22, further comprising a transmission section which transmits information concerning the optional target object designated by the designation section to a base station, which is connected to a portable body of the apparatus via a wireless communication network, and which stores position information corresponding to the information concerning the target object;
wherein the information obtaining section receives the position information corresponding to the information concerning the target object transmitted by the transmission section, said position information being transmitted from the base sation in accordance with the transmission by the transmission section, thereby obtaining the position information of the target object.

24. The apparatus according to claim 20, wherein the position information of the target object is transmitted from the target object, which is an external apparatus, to the information obtaining section such that the information obtaining section thereby obtains the position information of the target object.

25. The apparatus according to claim 20, further comprising:
an instruction section that instructs timing for initiating a series of operations for locating the position of the target object; and
a control section that performs the series of operations in accordance with the timing instructed by the instruction section, said series of operations including obtaining the imaging position information, imaging azimuth information and imaging angle-of-view information by the information obtaining section, calculating the position of the target object in the image by the calculation section, displaying the image by the display, determining whether or not the target object stays within the angle of view by the determination section, and outputting the information showing the position of the by the output section.

26. The apparatus according to claim 25, wherein, when the series of operations is completed, the instruction device instructs another said series of operations to be initiated, such that the series of operations for locating the position of the target object ts periodically performed.

27. A target position search apparatus comprising:
an information obtaining section that obtains position information of a target object, and imaging position information, imaging azimuth information, and imaging angle-of-view information of a camera;
a determination section which determines whether or not the target object and the camera are in an approach state;
a calculation section that, when the determination section determines that the target object and the camera are in the approach state, calculates a position of the target object in an image obtained by the camera based on the position information of the target object, and the imaging position information, imaging azimuth information, and imaging angle-of-view information of the camera which are obtained by the information obtaining section; and
an output section that outputs information showing the calculated position of the target object in the image to the display.

28. The apparatus according to claim 27, further comprising a display that displays the image obtained by the camera;
wherein the camera and the display are provided in a portable body of the apparatus, and the output device outputs the information showing the position of the target object in the image to the display.

29. The apparatus according to claim 27, further comprising a designation section which designates an optional target object;
wherein the information obtaining section obtains the position information of the optional target object designated by the designation section.

30. The apparatus according to claim 29, further comprising a transmission section which transmits information concerning the optional target object designated by the designation section to a base station, which is connected to a portable body of the apparatus via a wireless communication network, and which stores position information corresponding to the information concerning the target object;
wherein the information obtaining section receives the position information corresponding to the information concerning the target object transmitted by the transmission section, said position information being transmitted from the base station in accordance with the transmission by the transmission section, thereby obtaining the position information of the target object.

31. The apparatus according to claim 27, wherein the position information of the target object is transmitted from the target object, which is an external apparatus, to the information obtaining section such that the information obtaining section thereby obtains the position information of the target object.

32. The apparatus according to claim 27, further comprising:
an instruction section that instructs timing for initiating a series of operations for locating the position of the target object; and
a control section that performs the series of operations in accordance with the timing instructed by the instruction section, said series of operations including obtaining the imaging position information, imaging azimuth information and imaging angle-of-view information by the information obtaining section, determining whether or not the target object and the camera are in the approach state by the determination section, calculating the position of the target object in the image by the calculation section, and outputting the information showing the position of the by the output section.

33. The apparatus according to claim 32, wherein, when the series of operations is completed, the instruction device instructs another said series of operations to be initiated, such that the series of operations for locating the position of the target object is periodically performed.

* * * * *